(12) United States Patent
Lee et al.

(10) Patent No.: US 11,455,989 B2
(45) Date of Patent: Sep. 27, 2022

(54) ELECTRONIC APPARATUS FOR PROCESSING USER UTTERANCE AND CONTROLLING METHOD THEREOF

(71) Applicant: Samsung Electronics Co., Ltd., Suwon-si (KR)

(72) Inventors: Yeseul Lee, Suwon-si (KR); Sunok Kim, Suwon-si (KR); Hyelim Woo, Suwon-si (KR); Kyungtae Kim, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 142 days.

(21) Appl. No.: 16/580,622

(22) Filed: Sep. 24, 2019

(65) Prior Publication Data

US 2020/0160863 A1    May 21, 2020

(30) Foreign Application Priority Data

Nov. 20, 2018 (KR) .................. 10-2018-0143885

(51) Int. Cl.
*G10L 15/22* (2006.01)
*G10L 15/18* (2013.01)
(Continued)

(52) U.S. Cl.
CPC .............. *G10L 15/22* (2013.01); *G10L 13/00* (2013.01); *G10L 15/1815* (2013.01); *G10L 2015/088* (2013.01); *G10L 2015/223* (2013.01)

(58) Field of Classification Search
USPC .................. 704/235, 246, 247, 251, 252
See application file for complete search history.

(56) References Cited

U.S. PATENT DOCUMENTS 8,924,219 B1 * 12/2014 Bringert ................ G10L 15/183
704/275
9,934,781 B2    4/2018 Subhojit et al.
(Continued)

FOREIGN PATENT DOCUMENTS

| KR | 10-2011-0061267 A | 6/2011 |
| KR | 10-1393023 B1 | 5/2014 |
| KR | 10-2016-0001965 A | 1/2016 |

OTHER PUBLICATIONS

International Search Report dated Jan. 17, 2020, issued in an International Application No. PCT/KR2019/012387.
(Continued)

*Primary Examiner* — Leonard Saint Cyr
(74) *Attorney, Agent, or Firm* — Jefferson IP Law, LLP

(57) ABSTRACT

A method for processing a voice input and a system therefor are provided. The system includes a microphone, a speaker, a processor, and a memory. The processor, in a first operation, receives a first voice input including a first wake-up keyword, selects a first response model based on the first voice input, receives a second voice input after the first voice input, processes the second voice input, using an NLU module, generates a first response based on the processed second voice input, in a second operation, receives a third voice input including a second wake-up keyword different from the first wake-up keyword, selects a second response model based on the third voice input, receives a fourth voice input after the third voice input, processes the fourth voice input, using the NLU module, and generates a second response based on the processed fourth voice input.

20 Claims, 21 Drawing Sheets

(51) Int. Cl.
*G10L 13/00* (2006.01)
*G10L 15/08* (2006.01)

(56) References Cited

U.S. PATENT DOCUMENTS

| | | | |
|---|---|---|---|
| 2014/0278443 A1* | 9/2014 | Gunn | G06F 1/3265 704/275 |
| 2015/0302856 A1* | 10/2015 | Kim | G10L 25/48 704/273 |
| 2015/0379993 A1 | 12/2015 | Subhojit et al. | |
| 2016/0086603 A1* | 3/2016 | Rosner | H04R 29/004 704/275 |
| 2016/0267913 A1* | 9/2016 | Kim | G10L 15/22 |
| 2016/0284220 A1 | 9/2016 | Kar et al. | |
| 2016/0293168 A1 | 10/2016 | Chen | |
| 2017/0206895 A1* | 7/2017 | Tang | G10L 15/083 |
| 2017/0206900 A1 | 7/2017 | Lee et al. | |
| 2017/0269816 A1 | 9/2017 | Bradley et al. | |
| 2018/0082684 A1* | 3/2018 | Gunn | G10L 25/87 |
| 2018/0108343 A1* | 4/2018 | Stevans | G10L 15/26 |
| 2018/0108359 A9* | 4/2018 | Gunn | G06F 1/3265 |
| 2018/0190281 A1* | 7/2018 | Tang | G10L 15/22 |
| 2018/0190289 A1 | 7/2018 | Subhojit et al. | |
| 2018/0286401 A1 | 10/2018 | Oh et al. | |
| 2019/0354262 A1 | 11/2019 | Bradley et al. | |
| 2020/0111478 A1* | 4/2020 | Iyer | G10L 15/063 |

OTHER PUBLICATIONS

Anonymous; How to Create a Custom Alexa Wake Word in 30 Seconds (Step-by-Step Guide!); Voicebrew.com; Dec. 2, 2019; XP055844376; Retrieved from the Internet: URL:https://voicebrew.com/custom alexa-wake-word/.

Anonymous; How To Easily Change Alexa's Accent in 30 Seconds—VoiceBrew; voicebrew.com; Dec. 2, 2019; XP055844402; Retrieved from the Internet: URL:https://voicebrew.com/change-alexa-accent/.

European Search Report dated Oct. 14, 2021; European Appln. No. 19887714.4—1210 / 3824462 PCT/KR2019012387.

\* cited by examiner

ELECTRONIC APPARATUS FOR PROCESSING USER UTTERANCE AND CONTROLLING METHOD THEREOF

CROSS-REFERENCE TO RELATED APPLICATION(S)

This application is based on and claims priority under 35 U.S.C. § 119 of a Korean patent application number 10-2018-0143885, filed on Nov. 20, 2018, in the Korean Intellectual Property Office, the disclosure of which is incorporated by reference herein in its entirety.

BACKGROUND

1. Field

The disclosure relates to a technology for processing a user utterance.

2. Description of Related Art

In addition to an input scheme using a keyboard or a mouse of the related art, electronic apparatuses have recently supported various input schemes such as a voice input and the like. For example, the electronic apparatuses such as a smartphone or a tablet PC may recognize a user's voice entered in a state where a speech recognition service is executed and may execute an action corresponding to a voice input or may provide the found result.

Nowadays, the speech recognition service is being developed based on a technology for processing a natural language. The technology for processing the natural language refers to a technology that grasps the intent of the user utterance and provides the user with the result matched with the intent.

The above information is presented as background information only to assist with an understanding of the disclosure. No determination has been made, and no assertion is made, as to whether any of the above might be applicable as prior art with regard to the disclosure.

SUMMARY

When a user terminal recognizes a wake-up keyword included in the received voice input, the user terminal may change the state of the speech recognition service of the terminal to an activation state for processing a general voice input. A user may set a word desired by the user to the wake-up keyword. Accordingly, the wake-up keyword may be a starting point at which the user controls the user terminal via a voice input and may also include preference information associated with the user. However, due to the limitation of hardware, it is difficult for the user terminal to recognize the meaning of the wake-up keyword set by the user and then to provide the personalized service using the recognized information.

Aspects of the disclosure are to address at least the above-mentioned problems and/or disadvantages and to provide at least the advantages described below. Accordingly, an aspect of the disclosure is to provide an integrated intelligence system that provides a user with the personalized voice response service, using a wake-up keyword set by the user.

Additional aspects will be set forth in part in the description which follows and, in part, will be apparent from the description, or may be learned by practice of the presented embodiments.

In accordance with an aspect of the disclosure, a system is provided. The system includes a microphone, a speaker, at least one processor operatively connected to the microphone and the speaker, and a memory operatively connected to the at least one processor. The memory may be configured to store a natural language understanding (NLU) module, a first response model, and a second response model and to store instructions, when executed, that cause the at least one processor to, in a first operation, receive a first voice input including a first wake-up keyword for calling a voice-based intelligent assistant service, via the microphone, select the first response model based on the first voice input, receive a second voice input via the microphone after the first voice input, process the second voice input, using the NLU module, generate a first response based on the processed second voice input, in a second operation, receive a third voice input including a second wake-up keyword different from the first wake-up keyword, via the microphone, select the second response model based on the third voice input, receive a fourth voice input via the microphone after the third voice input, process the fourth voice input, using the NLU module, and generate a second response based on the processed fourth voice input. The first response may be generated using the first response model. The second response may be generated using the second response model.

In accordance with another aspect of the disclosure, a system is provided. The system includes a microphone, a speaker, at least one processor operatively connected to the microphone and the speaker, and a memory operatively connected to the at least one processor. The memory may be configured to store an automatic speech recognition (ASR) module, a natural language understanding (NLU) module, and a plurality of response models, and store instructions that, when executed, cause the at least one processor to receive a first voice input via the microphone, extract first text data from the first voice input, using the ASR module, and select at least one of the response models based at least partly on the extracted first text data.

In accordance with another aspect of the disclosure, a method of processing a voice input is provided. The method includes receiving a first voice input, extracting first text data from the first voice input, using an automatic speech recognition (ASR module, and selecting at least one of a plurality of response models based at least partly on the extracted first text data.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more such surfaces.

Figure 1:
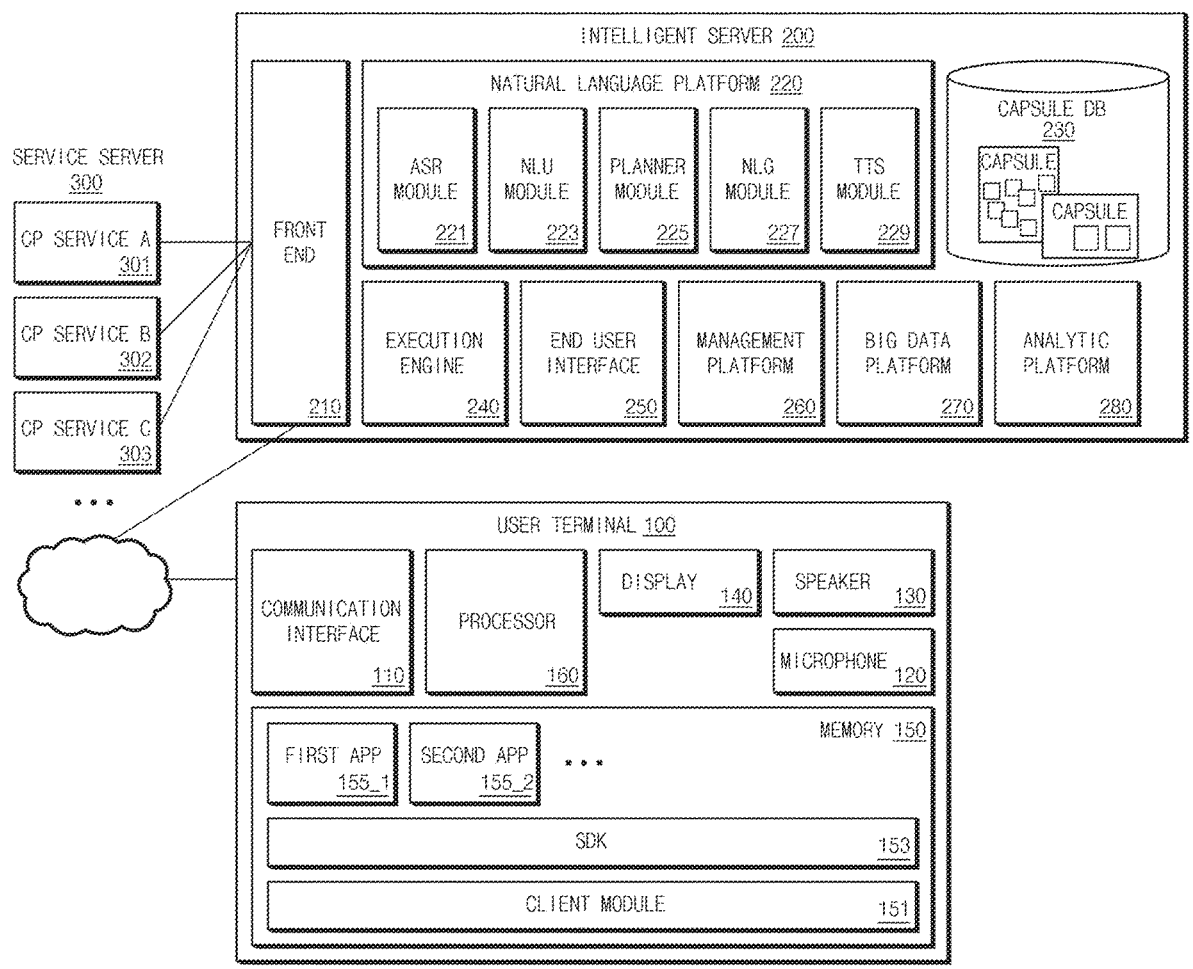
FIG. 1 is a block diagram illustrating an integrated intelligence system, according to an embodiment of the disclosure.

FIG. 1 is a block diagram illustrating an integrated intelligence system, according to an embodiment of the disclosure.

Referring to FIG. 1, an integrated intelligence system according to an embodiment may include a user terminal 100, an intelligent server 200, and a service server 300.

The user terminal 100 according to an embodiment may be a terminal device (or an electronic apparatus) capable of connecting to Internet, and may be, for example, a mobile phone, a smartphone, a personal digital assistant (PDA), a notebook computer, television (TV), a white household appliance, a wearable device, a head mount display (HMD), or a smart speaker.

According to the illustrated embodiment, the user terminal 100 may include a communication interface 110, a microphone 120, a speaker 130, a display 140, a memory 150, or a processor 160. The listed components may be operatively or electrically connected to one another.

The communication interface 110 according to an embodiment may be configured to transmit or receive data to or from an external device. The microphone 120 according to an embodiment may receive a sound (e.g., a user utterance) to convert the sound into an electrical signal. According to an embodiment, the speaker 130 may output the electrical signal as a sound (e.g., voice). According to an embodiment, the display 140 may be configured to display an image or a video. According to an embodiment, the display 140 may also display the graphic user interface (GUI) of the running app (or an application program).

According to an embodiment, the memory 150 may store a client module 151, a software development kit (SDK) 153, and a plurality of apps 155. The client module 151 and the SDK 153 may constitute a framework (or a solution program) for performing general-purposed functions. Furthermore, the client module 151 or the SDK 153 may constitute the framework for processing a voice input.

According to an embodiment, the plurality of apps 155 in the memory 150 may be a program for performing the specified function. According to an embodiment, the plurality of apps 155 may include a first app 155_1 and a second app 155_2. According to an embodiment, each of the plurality of apps 155 may include a plurality of actions for performing the specified function. For example, the apps may include an alarm app, a message app, and/or a schedule app. According to an embodiment, the plurality of apps 155 may be executed by the processor 160 to sequentially execute at least part of the plurality of actions.

According to an embodiment, the processor 160 may control overall operations of the user terminal 100. For example, the processor 160 may be electrically connected to the communication interface 110, the microphone 120, the speaker 130, and the display 140 to perform a specified action.

According to an embodiment, the processor 160 may also execute the program stored in the memory 150 to perform the specified function. For example, the processor 160 may execute at least one of the client module 151 or the SDK 153 to perform the following actions for processing a voice input. The processor 160 may control the actions of the plurality of apps 155 via the SDK 153. The following actions described as the actions of the client module 151 or the SDK 153 may be the action by the execution of the processor 160.

According to an embodiment, the client module 151 may receive a voice input. For example, the client module 151 may receive a voice signal corresponding to a user utterance detected via the microphone 120. The client module 151 may transmit the received voice input to the intelligent server 200. The client module 151 may transmit the state information of the user terminal 100 together with the received voice input, to the intelligent server 200. For example, the state information may be the execution state information of an app.

According to an embodiment, the client module 151 may receive the result corresponding to the received voice input. For example, the client module 151 may receive the result corresponding to the received voice input when the intelligent server 200 is capable of calculating the result corresponding to the received voice input. The client module 151 may display the received result in the display 140.

According to an embodiment, the client module 151 may receive the plan corresponding to the received voice input. The client module 151 may display the result of executing a plurality of actions of an app in the display 140 depending on the plan. For example, the client module 151 may sequentially display the execution result of a plurality of actions in a display. For another example, the user terminal 100 may display only a part of results (e.g., the result of the last action) of executing a plurality of actions, on the display.

According to an embodiment, the client module 151 may receive a request for obtaining information necessary to calculate the result corresponding to a voice input, from the intelligent server 200. According to an embodiment, the client module 151 may transmit the necessary information to the intelligent server 200 in response to the request.

According to an embodiment, the client module 151 may transmit information about the result of executing a plurality of actions depending on the plan, to the intelligent server 200. The intelligent server 200 may determine that the received voice input is processed correctly, using the result information.

According to an embodiment, the client module 151 may include a voice recognition module. According to an embodiment, the client module 151 may recognize a voice input to perform the limited function, via the voice recognition module. For example, the client module 151 may launch an intelligent app that processes a voice input for performing an organic action, via a specified input (e.g., wake up!).

According to an embodiment, the intelligent server 200 may receive the information associated with a user's voice input from the user terminal 100 over a communication network. According to an embodiment, the intelligent server 200 may change the data associated with the received voice input to text data. According to an embodiment, the intelligent server 200 may generate a plan for performing a task corresponding to a user voice input, based on the text data.

According to an embodiment, the plan may be generated by an artificial intelligent (AI) system. The AI system may be a rule-based system, or may be a neural network-based system (e.g., a feedforward neural network (FNN) or a recurrent neural network (RNN)). Alternatively, the AI system may be a combination of the above-described systems or an AI system different from the above-described system. According to an embodiment, the plan may be selected from a set of predefined plans or may be generated in real time in response to a user request. For example, the AI system may select at least one plan of the plurality of predefined plans.

According to an embodiment, the intelligent server 200 may transmit the result according to the generated plan to the user terminal 100 or may transmit the generated plan to the user terminal 100. According to an embodiment, the user terminal 100 may display the result according to the plan, on a display. According to an embodiment, the user terminal 100 may display the result of executing the action according to the plan, on the display.

The intelligent server 200 according to an embodiment may include a front end 210, a natural language platform 220, a capsule database (DB) 230, an execution engine 240, an end user interface (UI) 250, a management platform 260, a big data platform 270, or an analytic platform 280.

According to an embodiment, the front end 210 may receive a voice input received from the user terminal 100. The front end 210 may transmit a response corresponding to the voice input.

According to an embodiment, the natural language platform 220 may include an automatic speech recognition (ASR) module 221, a natural language understanding (NLU) module 223, a planner module 225, a natural language generator (NLG) module 227, and a text to speech module (TTS) module 229.

According to an embodiment, the ASR module 221 may convert the voice input received from the user terminal 100 to text data. According to an embodiment, the NLU module 223 may grasp the intent of the user, using the text data of the voice input. For example, the NLU module 223 may grasp the intent of the user by performing syntactic analysis or semantic analysis. According to an embodiment, the NLU module 223 may grasp the meaning of words extracted from the voice input by using linguistic features (e.g., syntactic elements) such as morphemes or phrases and may determine the intent of the user by matching the grasped meaning of the words to an intent.

According to an embodiment, the planner module 225 may generate the plan by using the intent and a parameter, which are determined by the NLU module 223. According to an embodiment, the planner module 225 may determine a plurality of domains necessary to perform a task, based on the determined intent. The planner module 225 may determine a plurality of actions included in each of the plurality of domains determined based on the intent. According to an embodiment, the planner module 225 may determine the parameter necessary to perform the determined plurality of actions or the result value output by the execution of the plurality of actions. The parameter and the result value may be defined as a concept of the specified form (or class). As such, the plan may include the plurality of actions and a plurality of concepts determined by the intent of the user. The planner module 225 may determine the relationship between the plurality of actions and the plurality of concepts stepwise (or hierarchically). For example, the planner module 225 may determine the execution sequence of the plurality of actions, which are determined based on a user's intent, based on the plurality of concepts. In other words, the planner module 225 may determine the execution sequence of the plurality of actions, based on the parameters necessary to perform the plurality of actions and the result output by the execution of the plurality of actions. As such, the planner module 225 may generate a plan including information (e.g., ontology) of the relationship between a plurality of actions and a plurality of concepts. The planner module 225 may generate the plan, using the information stored in the capsule DB 230 storing a set of relationships between concepts and actions.

According to an embodiment, the NLG module 227 may change the specified information into information in the text form. The information changed to the text form may be a form of a natural language utterance. The TTS module 229 according to an embodiment may change information of the text form to information of a voice form.

According to an embodiment, all or part of the functions of the natural language platform 220 may be implemented in the user terminal 100.

The capsule DB 230 may store information about the relationship between the actions and the plurality of concepts corresponding to a plurality of domains. According to an embodiment, the capsule may include a plurality of action objects (or action information) and concept objects (or concept information) included in the plan. According to an embodiment, the capsule DB 230 may store the plurality of capsules in the form of a concept action network (CAN). According to an embodiment, the plurality of capsules may be stored in the function registry included in the capsule DB 230. The capsule DB 230 may include a strategy registry that stores strategy information necessary to determine a plan corresponding to a voice input. The strategy information may include reference information for determining a single plan when there are a plurality of plans corresponding to the voice input. According to an embodiment, the capsule DB 230 may include a follow up registry that stores the information of the follow-up action for suggesting a follow-up action to the user in the specified context. For example, the follow-up action may include a follow-up utterance. According to an embodiment, the capsule DB 230 may include a layout registry for storing layout information of the information output via the user terminal 100. According to an embodiment, the capsule DB 230 may include a vocabulary registry that stores vocabulary information included in the capsule information. According to an embodiment, the capsule DB 230 may include a dialog registry that stores information about dialog (or interaction) with the user.

The capsule DB 230 may update the stored object via a developer tool. For example, the developer tool may include a function editor for updating an action object or a concept object. The developer tool may include a vocabulary editor for updating the vocabulary. The developer tool may include a strategy editor that generates and registers a strategy for determining the plan. The developer tool may include a dialog editor that creates a dialog with the user. The developer tool may include a follow up editor capable of activating the follow-up target and editing the follow-up utterance for providing a hint. The follow-up target may be determined based on the currently set target, the preference of the user, or environment condition. According to an embodiment, the capsule DB 230 may be implemented in the user terminal 100.

According to an embodiment, the execution engine 240 may calculate the result, using the generated plan. The end user interface 250 may transmit the calculated result to the user terminal 100. As such, the user terminal 100 may receive the result and may provide the user with the received result. According to an embodiment, the management platform 260 may manage information used by the intelligent server 200. According to an embodiment, the big data platform 270 may collect data of the user. According to an embodiment, the analytic platform 280 may manage the quality of service (QoS) of the intelligent server 200. For example, the analytic platform 280 may manage the component and processing speed (or efficiency) of the intelligent server 200.

According to an embodiment, the service server 300 may provide the user terminal 100 with a specified service, such as CP Service A 301, CP Service B 302, CP Service C 303, etc. (e.g., food order, hotel reservation, etc.). According to an embodiment, the service server 300 may be a server operated by the third party. According to an embodiment, the service server 300 may provide the intelligent server 200 with information for generating a plan corresponding to the received voice input. The provided information may be stored in the capsule DB 230. Furthermore, the service server 300 may provide the intelligent server 200 with result information according to the plan.

In the above-described integrated intelligence system, the user terminal 100 may provide the user with various intelligent services in response to a user input. The user input may include, for example, an input through a physical button, a touch input, or a voice input.

According to an embodiment, the user terminal 100 may provide a speech recognition service via an intelligent app (or a speech recognition app) stored therein. In this case, for example, the user terminal 100 may recognize the user utterance or the voice input received via the microphone and may provide the user with a service corresponding to the recognized voice input.

According to an embodiment, the user terminal 100 may perform a specified action, based on the received voice input, exclusively, or together with the intelligent server and/or the service server. For example, the user terminal 100 may execute an app corresponding to the received voice input and may perform the specified action via the executed app.

According to an embodiment, when the user terminal 100 provides a service together with the intelligent server 200 and/or the service server, the user terminal may detect a user utterance, using the microphone 120 and may generate a signal (or voice data) corresponding to the detected user utterance. The user terminal may transmit the voice data to the intelligent server 200, using the communication interface 110.

According to an embodiment, the intelligent server 200 may generate a plan for performing a task corresponding to the voice input or the result of performing an action depending on the plan, as the response to the voice input received from the user terminal 100. For example, the plan may include a plurality of actions for performing the task corresponding to the voice input of the user and a plurality of concepts associated with the plurality of actions. The concept may define a parameter to be input for the execution of the plurality of actions or a result value output by the execution of the plurality of actions. The plan may include relationship information between a plurality of actions and a plurality of concepts.

According to an embodiment, the user terminal 100 may receive the response, using the communication interface 110. The user terminal 100 may output the voice signal generated in user terminal 100, to the outside using the speaker 130 or may output an image generated in the user terminal 100, to the outside using the display 140.

Figure 2:
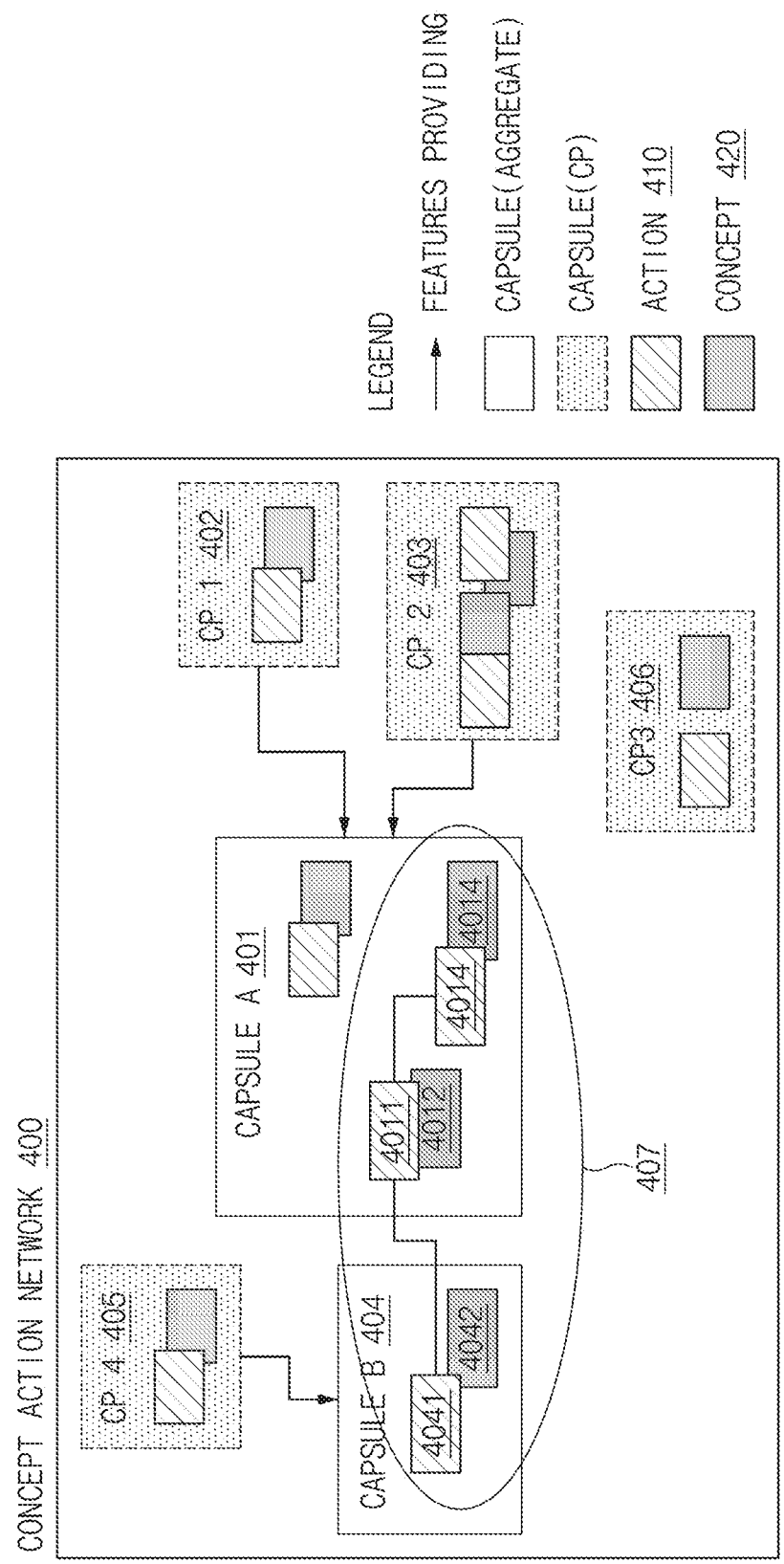
FIG. 2 is a diagram illustrating a form in which relationship information between a concept and an action is stored in a database, according to various embodiments of the disclosure.

FIG. 2 is a diagram illustrating the form in which relationship information between a concept and an action is stored in a database, according to an embodiment of the disclosure.

Referring to FIG. 2, the capsule database (e.g., the capsule DB 230) of the intelligent server 200 may store a capsule in the form of a concept action network (CAN) 400. The capsule database may store an action for processing a task corresponding to a voice input and a parameter necessary for the action, in the CAN form.

The capsule database may store a plurality of capsules (e.g., capsule A 401 and capsule B 404) respectively corresponding to a plurality of domains (e.g., applications). According to an embodiment, a single capsule (e.g., the capsule A 401) may correspond to one domain (e.g., a location (geo) or an application). Furthermore, the single capsule may correspond to at least one service provider (e.g., CP 1 402, CP 2 403, CP 3 406 or CP 4 405) for performing the function of the domain associated with the capsule. According to an embodiment, the single capsule may include at least one or more actions 410 and at least one or more concepts 420 for performing a specified function.

The natural language platform 220 may generate a plan for performing a task corresponding to the received voice input, using the capsule stored in the capsule database. For example, the planner module 225 of the natural language platform may generate a plan, using the capsule stored in the capsule database. For example, a plan 407 may be generated using actions 4011 and 4013 and concepts 4012 and 4014 of the capsule A 401 and an action 4041 and a concept 4042 of the capsule B 404.

Figure 3:
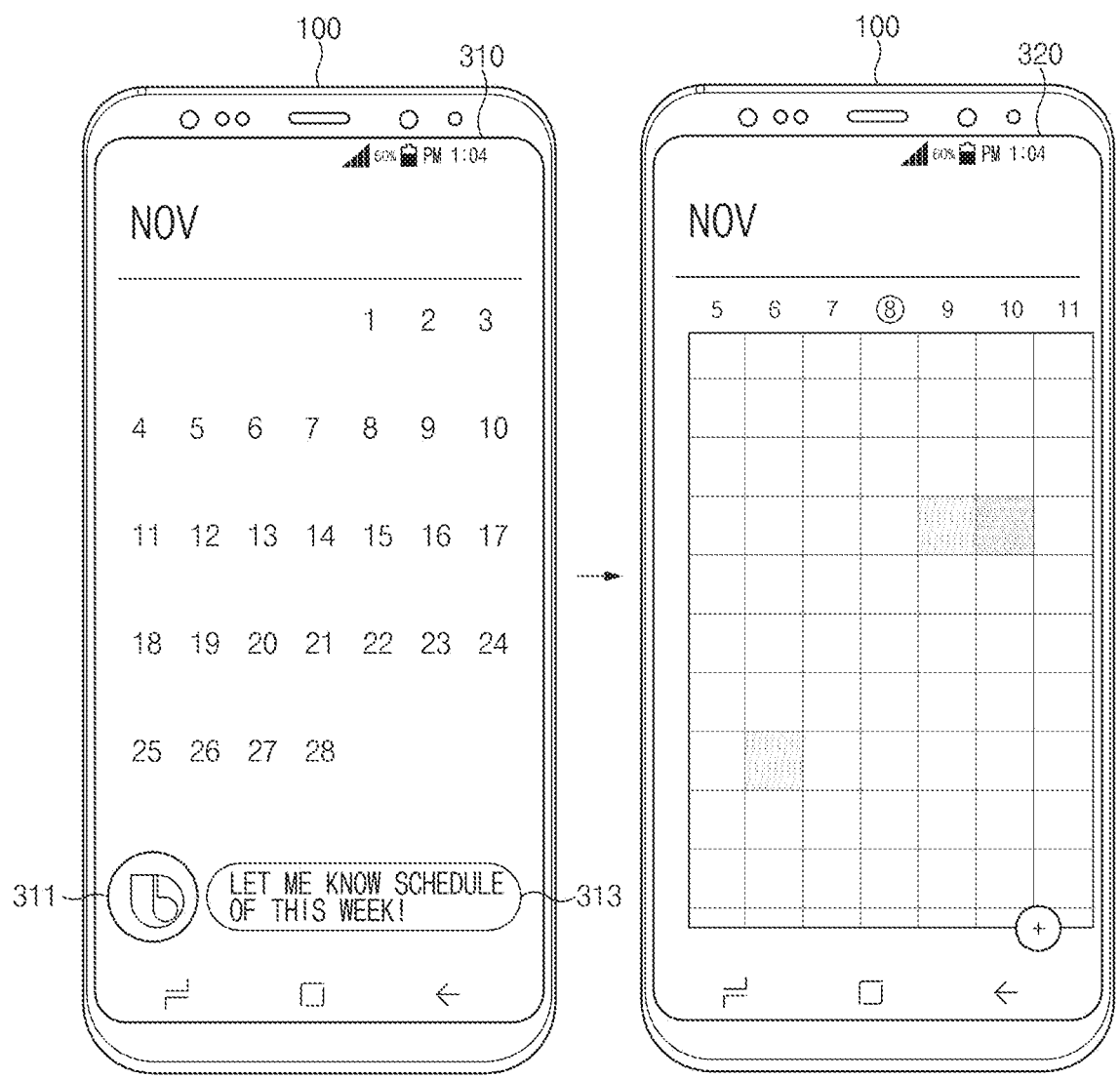
FIG. 3 is a view illustrating a user terminal displaying a screen of processing a voice input received through an intelligent app, according to an embodiment of the disclosure.

FIG. 3 is a view illustrating a screen in which a user terminal processes a received voice input through an intelligent app, according to an embodiment of the disclosure.

Referring to FIG. 3, the user terminal 100 may execute an intelligent app to process a user input through the intelligent server 200.

According to an embodiment, in screen 310, when recognizing a specified voice input (e.g., wake up!) or receiving an input via a hardware key (e.g., the dedicated hardware key), the user terminal 100 may launch an intelligent app for processing a voice input. For example, the user terminal 100 may launch an intelligent app in a state in which a schedule app is being executed. According to an embodiment, the user terminal 100 may display an object (e.g., an icon) 311 corresponding to the intelligent app, in the display 140. According to an embodiment, the user terminal 100 may receive a voice input by a user utterance. For example, the user terminal 100 may receive a voice input saying that "Let me know the schedule of this week!". According to an embodiment, the user terminal 100 may display a user interface (UI) 313 (e.g., an input window) of an intelligent app, in which text data of the received voice input is displayed, in a display According to an embodiment, in screen 320, the user terminal 100 may display the result corresponding to the received voice input, in the display. For example, the user terminal 100 may receive the plan corresponding to the received user input and may display 'the schedule of this week' in the display depending on the plan.

Figure 4A:
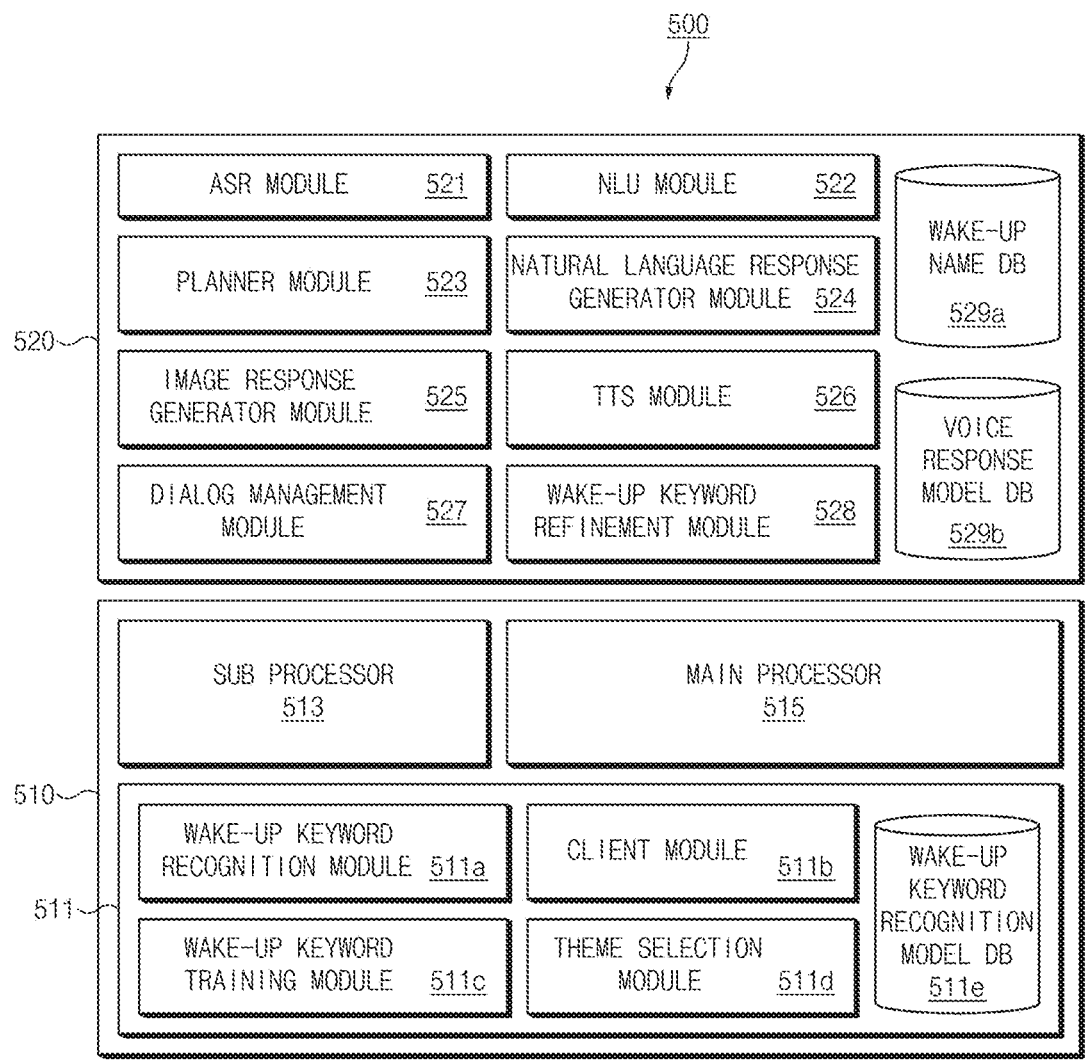
FIG. 4A is a block diagram illustrating a configuration of an integrated intelligence system, according to an embodiment of the disclosure.

FIG. 4A is a block diagram illustrating a configuration of an integrated intelligence system 500, according to an embodiment of the disclosure.

Referring to FIG. 4A, the integrated intelligence system 500 may include a user terminal 510 and an intelligent server 520. The user terminal 510 and the intelligent server 520 may be similar to the user terminal 100 and the intelligent server 200 of FIG. 1.

According to an embodiment, the user terminal 510 may include a memory 511 (e.g., the memory 150 of FIG. 1), a sub processor 513, and a main processor 515 (e.g., the processor 160 of FIG. 1). According to an embodiment, the configuration of the user terminal 510 may not be limited thereto and may further include the configuration of the user terminal 100 of FIG. 1.

According to an embodiment, the memory 511 may store a wake-up keyword recognition module 511a, a client module 511b, a wake-up keyword training module 511c, a theme selection module 511d, and a wake-up keyword recognition model database (DB) 511e. The wake-up keyword recognition module 511a, the client module 511b, the wake-up keyword training module 511c, and the theme selection module 511d may be a framework for performing general-purposed functions. According to an embodiment, the wake-up keyword recognition module 511a, the client module 511b, the wake-up keyword training module 511c, and the theme selection module 511d may be executed by a processor (e.g., the sub processor 513 and the main processor 515) and then the function thereof may be implemented. According to an embodiment, the wake-up keyword recognition module 511a, the client module 511b, the wake-up keyword training module 511c, and the theme selection module 511d may be implemented with not only software but also hardware.

According to an embodiment, a user utterance including a wake-up keyword recognized by the wake-up keyword recognition module 511a may be a wake-up utterance for calling a speech recognition service (or a voice-based intelligent assistant service). For example, a voice input including the wake-up keyword may be a voice input for changing the state of a general voice input to a state where the general voice input is capable of being processed. For example, the general voice input may be a voice input for performing a specified function (e.g., the transmission/reception of a message).

According to an embodiment, the memory 511 may include at least one memory. For example, the memory 511 may include a separate memory for storing the wake-up keyword recognition model DB 511e. In other words, the memory 511 may include a first memory storing instructions for controlling the operation of a processor (e.g., the sub processor 513 and the main processor 515) and a second memory storing the wake-up keyword recognition model DB 511e. For example, the first memory may store the wake-up keyword recognition module 511a, the client module 511b, the wake-up keyword training module 511c, and the theme selection module 511d. According to an embodiment, the second memory may be a memory physically separated from the first memory. The second memory may be accessed by the sub processor 513 in a state before the speech recognition service or the voice-based intelligent assistant service provided by the user terminal 510 is activated. For example, the sub processor 513 may read out information (e.g., wake-up keyword recognition model information) stored in the second memory to recognize a voice input for activating the speech recognition service or voice-based intelligent assistant service provided by the user terminal 510. For another example, the memory 511 may include one memory storing the wake-up keyword recognition module 511a, the client module 511b, the wake-up keyword training module 511c, the theme selection module 511d, and the wake-up keyword recognition model DB 511e. In other words, the memory 511 may not separately include a memory for the wake-up keyword recognition model DB 511e.

According to an embodiment, the sub processor 513 may control a part of operations of the user terminal 510. In other words, the sub processor 513 may control the user terminal 510 restrictively. For example, the sub processor 513 may recognize a specified word (or a wake-up keyword) to activate the main processor 515. In other words, the state of the user terminal 510 may be changed from a deactivation state (or a standby state or a sleep state) where the sub processor 513 performs only the part of operations (e.g., the maintaining of a system booting state) to an activation state for performing an operation of providing a plurality of services (e.g., a message service or a phone service). According to an embodiment, the sub processor 513 may be a processor that consumes low power.

According to an embodiment, the sub processor 513 may perform an operation of recognizing a wake-up keyword, by executing the wake-up keyword recognition module 511a. The following operation described as the operation of the wake-up keyword recognition module 511a may be an operation by the execution of the sub processor 513.

According to an embodiment, the wake-up keyword recognition module 511a may recognize words of the restricted number. For example, the wake-up keyword recognition module 511a may recognize the wake-up keyword for activating the main processor 515. According to an embodiment, the wake-up keyword recognition module 511a may use a wake-up keyword recognition model. The wake-up keyword recognition model may include information necessary to recognize the wake-up keyword. For example, when a speech recognition function is performed based on a hidden Markov model (HMM) algorithm, the wake-up keyword recognition model may include a state initial probability, a state transition probability, an observation probability, or the like. For another example, when the speech recognition function is performed based on a neural network algorithm, the wake-up keyword recognition module may include neural network model information such as a layer, the type and structure of a node, a weight for each node, network connection information, a non-linear activation function, or the like. According to an embodiment, when recognizing the wake-up keyword through the wake-up keyword recognition module 511a, the sub processor 513 may activate the main processor 515.

According to an embodiment, the wake-up keyword recognition module 511a may measure the similarity between a plurality of voice inputs to determine whether the plurality of voice inputs are the same as one another. For example, the wake-up keyword recognition module 511a may extract feature vectors of the plurality of voice inputs and may measure the similarity between the feature vectors extracted using dynamic time warping (DTW). For another example, when a speech recognition function is performed based on the HMI model algorithm, the wake-up keyword recognition module 511a may measure the similarity between the plurality of voice inputs, using a forward-backward probability. For still another example, when the wake-up keyword recognition module 511a is executed based on the neural network algorithm, the wake-up keyword recognition module 511a may measure the similarity between the plurality of voice inputs using the phoneme level measured through a phoneme recognizer. According to an embodiment, when the measured similarity is not less than a specified value, the wake-up keyword recognition module 511a may determine that the plurality of voice inputs are the same as one another. According to an embodiment, the wake-up keyword recognition module 511a may determine whether the plurality of voice inputs for training a wake-up keyword include the same word. According to an embodiment, the operation of the wake-up keyword recognition module 511a for training a wake-up keyword may be performed by the main processor 515.

According to an embodiment, the main processor 515 may execute the client module 511b to perform an operation for processing a voice input. The voice input may be a user input for commanding to perform a specified task. The following operation described as the operation of the client module 511b may be an operation by the execution of the main processor 515.

According to an embodiment, the client module 511b may transmit the voice input for performing the specified task, to the intelligent server 520. According to an embodiment, the client module 511b may receive a plan corresponding to the voice input through the intelligent server 520. The plan may include operation information for performing the specified task. According to an embodiment, the client module 511b may execute the operation of an app depending on the received plan to perform the specified task and thus may provide the user with the result.

According to an embodiment, when the client module 511b receives a voice input for registering a wake-up keyword, the client module 511b may transmit the voice input to the intelligent server 520. For example, the client module 511b may transmit the voice input to the intelligent server 520 through a communication interface (e.g., the communication interface 110 of FIG. 1). According to an embodiment, the client module 511b may receive the result of determining whether the voice input includes a specified word, from the intelligent server 520. For example, the client module 511b may receive the determined result through the communication interface. According to an embodiment, the client module 511b may determine whether the wake-up keyword is capable of being registered, based on the determined result. Accordingly, when the received voice input is capable of being registered as the wake-up keyword, the client module 511b may register the wake-up keyword based on the received voice input through the wake-up keyword training module 511c.

According to an embodiment, the main processor 515 may execute the wake-up keyword training module 511c to perform an operation of registering (or generating) the wake-up keyword. The user may register the word desired by the user, as the wake-up keyword for activating the main processor 515. The following operation described as the operation of the wake-up keyword training module 511c may be an operation by the execution of the main processor 515.

According to an embodiment, the wake-up keyword training module 511c may perform wake-up keyword recognition training for registering a wake-up keyword. The wake-up keyword training module 511c may repeatedly perform the wake-up keyword recognition training based on the received voice input. For example, when a speech recognition function is performed based on the HMI algorithm, the wake-up keyword training module 511c may generate a wake-up keyword recognition model, by performing model training using an expectation maximization (EM) algorithm or by performing adaptation training using maximum likelihood linear regression (MLLR) and maximum a posteriori estimation (MAP). For another example, when the speech recognition function is performed based on the neural network algorithm, the wake-up keyword training module 511c may perform model training using a feedforward-propagation algorithm or a backward-propagation algorithm or may perform adaptation training using linear transformation. According to an embodiment, the wake-up keyword training module 511c may determine whether the same wake-up keyword is included in the voice input repeatedly received through the wake-up keyword recognition module 511a. Accordingly, the wake-up keyword recognition training may be performed based on the voice input including the same wake-up keyword. According to an embodiment, the wake-up keyword training module 511c may generate the wake-up keyword recognition model through the wake-up keyword recognition training.

According to an embodiment, the theme selection module 511d may provide the user with a list for selecting a response model (e.g., a voice response model or a response theme model). For example, the list may include at least one response model. According to an embodiment, the intelligent server 520 may select at least one response model included in the list. For example, the intelligent server 520 may determine the at least one response model based on the wake-up keyword. For another example, the intelligent server 520 may select the at least one response model based on user information. According to an embodiment, the theme selection module 511d may receive a user input to select at least one of at least one response model included in the list. According to an embodiment, when the theme selection module 511d trains the recognition of the wake-up keyword through the wake-up keyword training module 511c, the theme selection module 511d may provide the list and may receive a user input to select at least one response model included in the list. According to an embodiment, the client module 511b may transmit the received user input to the intelligent server 520.

According to an embodiment, the intelligent server 520 may select a response model depending on the received user input and may generate a response corresponding to a user input (e.g., a voice input), using the selected response model. For example, the intelligent server 520 may generate the response corresponding to the user input in the specified form depending on the selected response model. Alternatively, the user terminal 510 may provide the user with the response of a format (or theme) by the selection of the user.

According to an embodiment, the theme selection module 511d may be integrated with the wake-up keyword training module 511c as a single module. In other words, the theme selection module 511d and the wake-up keyword training module 511c may be implemented with a single hardware module or software module.

According to an embodiment, the generated wake-up keyword recognition model may be stored in the wake-up keyword recognition model DB 511e. According to an embodiment, the wake-up keyword recognition module 511a may recognize the wake-up keyword, using the wake-up keyword recognition model information stored in the wake-up keyword recognition model DB 511e.

According to an embodiment, the intelligent server 520 may include an automatic speech recognition (ASR) module 521 (e.g., the ASR module 221 of FIG. 1), a natural language understanding (NLU) module 522 (e.g., the NLU module 223 of FIG. 1), an planner module 523 (e.g., the planner module 225 of FIG. 1), a natural language response generator module 524, an image response generator module 525, a first text-to-speech (TTS) module 526, a dialog management module 527, a wake-up keyword refinement module 528, a wake-up name database (DB) 529a, and a response model database (DB) 529b. According to an embodiment, the configuration of the intelligent server 520 may not be limited thereto and may further include the configuration of the intelligent server 520 of FIG. 1. The configuration of the intelligent server 520 may be the program stored in a memory or may be a database.

According to an embodiment, the ASR module 521 may change a voice input into text data. According to an embodiment, the ASR module 521 may be implemented using an algorithm such as a hidden Markov model (HMM) algorithm, a weighted finite-state transducer (wFST) algorithm, a neural network algorithm, or the like. For example, the ASR module 521 may change the voice input into the text data, by comparing a specified word with the voice input using a distance measure method. For example, the distance measure method may include a measurement method such as Levenshtein distance, Jaro-Winkler distance, or the like. For another example, the distance measure method may include a method of measuring a distance between texts at a phoneme level after conversion to a pronunciation through a grapheme to phoneme (G2P).

According to an embodiment, the ASR module 521 may include large vocabulary continuous speech recognition (LVCSR). Accordingly, the ASR module 521 may use a calculation process more complicated than the wake-up keyword recognition module 511a of the user terminal 510 and may recognize a lot of words.

According to an embodiment, the NLU module 522 may determine the intent and parameter corresponding to the voice input, using the text data transmitted from the ASR module 521.

According to an embodiment, the planner module 523 may generate the plan corresponding to the voice input, based on the intent and parameter determined by the NLU module 522. The plan may include operation information for performing the task corresponding to the voice input. According to an embodiment, the planner module 523 may arrange operations for performing the task stepwise and may determine a parameter entered for the execution of the arranged operations or a concept defining the result value output by the execution, and thus may generate the plan.

According to an embodiment, the natural language response generator module 524 may generate natural language information to be provided to the user, the determined intent and parameter. For example, the natural language information may include not only visual information (e.g., image information) but also auditory information (e.g., sound information). According to an embodiment, the auditory information may be information output to the user with a voice. The text corresponding to the auditory information to be provided with the voice may be generated depending on a specified template. For example, the specified template may be associated with the form provided by the text. Furthermore, the complex text may be generated through an NLG module (e.g., the NLG module 227 of FIG. 1). According to an embodiment, the natural language response generator module 524 may generate natural language information, using one template of a plurality of templates. According to an embodiment, the natural language response generator module 524 may generate information to be provided to the user, using a wake-up name. For example, the natural language response generator module 524 may generate a text including the wake-up name. For example, the wake-up name may be generated by refining the wake-up keyword. The wake-up name may be stored in the wake-up name DB 529a.

According to an embodiment, the image response generator module 525 may generate image information based on the determined intent and parameter. For example, the image information may be information other than natural language information generated through the natural language response generator module 524 and may include image information and sound information corresponding to the image information. According to an embodiment, the image information may be generated depending on a specified template. For example, the specified template may include location information, color information, shape information, or the like of an image object. According to an embodiment, the image response generator module 525 may generate image information, using one template of the plurality of templates.

According to an embodiment, the TTS module 526 may convert natural language information, which is generated by the natural language response generator module 524, into a voice signal. The TTS module 526 may be implemented in various forms depending on an algorithm. For example, the TTS module 526 may be implemented in a unit bonding form. For example, the TTS module 526 implemented in the unit bonding form may include a large unit voice database. The large unit voice database may store a TTS model with which a voice signal recorded through a plurality of persons is tagged. According to an embodiment, the TTS module 526 may convert the natural language information into the voice signal, using the TTS model. According to another embodiment, the TTS module 526 may convert the natural language information into the voice signal by adjusting a voice element. For example, the TTS module 526 may convert the natural language information into the voice signal by adjusting a pitch, an utterance speed, an intonation, or the like. The adjustment of the voice element may be adjusted (e.g., parametric TTS method) while the natural language information is converted into the voice signal or may be adjusted (e.g., post-processing method) after the natural language information is converted into the voice signal.

According to an embodiment, the dialog management module 527 may manage the flow of the conversation with the user. For example, the dialog management module 527 may determine the response to the voice input received based on the context during the conversation with the user. According to an embodiment, the dialog management module 527 may determine the response to the voice input, using a dialog management model. For example, the dialog management model may determine the response.

According to an embodiment, the wake-up keyword refinement module 528 may refine the registered wake-up keyword to generate the wake-up name of the user terminal 510. According to an embodiment, the intelligent server 520 may generate the response corresponding to the voice input, using the wake-up name. In other words, the intelligent server 520 may provide the user terminal 510 with the response including the wake-up name. For example, the wake-up name may be used as the name of the voice assistant providing a response corresponding to the voice input of the user. According to an embodiment, the wake-up keyword refinement module 528 may store the generated wake-up name in the wake-up name DB 529*a*.

According to an embodiment, the intelligent server 520 may select a response model for providing the response corresponding to the user input. According to an embodiment, the intelligent server 520 may select a response model based on the wake-up keyword. For example, the intelligent server 520 may obtain text data corresponding to the wake-up keyword through the ASR module 521 and may select a response model based on the obtained text data. According to another embodiment, the intelligent server 520 may select the response model based on user information. For example, user information may include at least one of a gender, an age, a residence area, and user terminal usage information.

According to an embodiment, the intelligent server 520 may generate the response corresponding to the received voice input, using the selected response model. For example, the intelligent server 520 may generate the response corresponding to the received voice input in the form according to the selected response model. According to an embodiment, the configuration for generating the response of the intelligent server 520 may be set based on the selected voice input model. For example, the natural language response generator module 524 and the image response generator module 525 may be set to generate information (e.g., natural language information and image information) provided to the user by using the template corresponding to the selected voice input model. For another example, the TTS module 526 may convert a natural language into a voice signal, using the TTS model corresponding to the selected voice input model. The dialog management module 527 may determine a response, using a dialog management model corresponding to the selected voice input model.

According to an embodiment, the response model DB 529*b* may store information of a TTS model. For example, the information of a TTS model may store template information, TTS model information, and dialog management model information. Accordingly, the intelligent server 520 may generate the response corresponding to the received voice input, using information of the TTS model stored in the response model DB 529*b*. According to an embodiment, the response model DB 529*b* may store information of a plurality of TTS models. The intelligent server 520 may determine one TTS model of the plurality of TTS models based on the registered wake-up keyword. According to an embodiment, the user terminal 510 may register a plurality of wake-up keywords. The intelligent server 520 may generate a response, using the TTS model corresponding to the recognized wake-up keyword.

According to an embodiment, the intelligent server 520 may generate guide information for receiving a specified voice input from the user. For example, the intelligent server 520 may generate guide information for receiving a voice input for wake-up keyword training. Moreover, when receiving a voice input including an inappropriate word, the intelligent server 520 may generate guide information for receiving different voice inputs. According to an embodiment, the intelligent server 520 may transmit the generated guide information to the user terminal 510. The user terminal 510 may output the guide information.

Figure 4B:
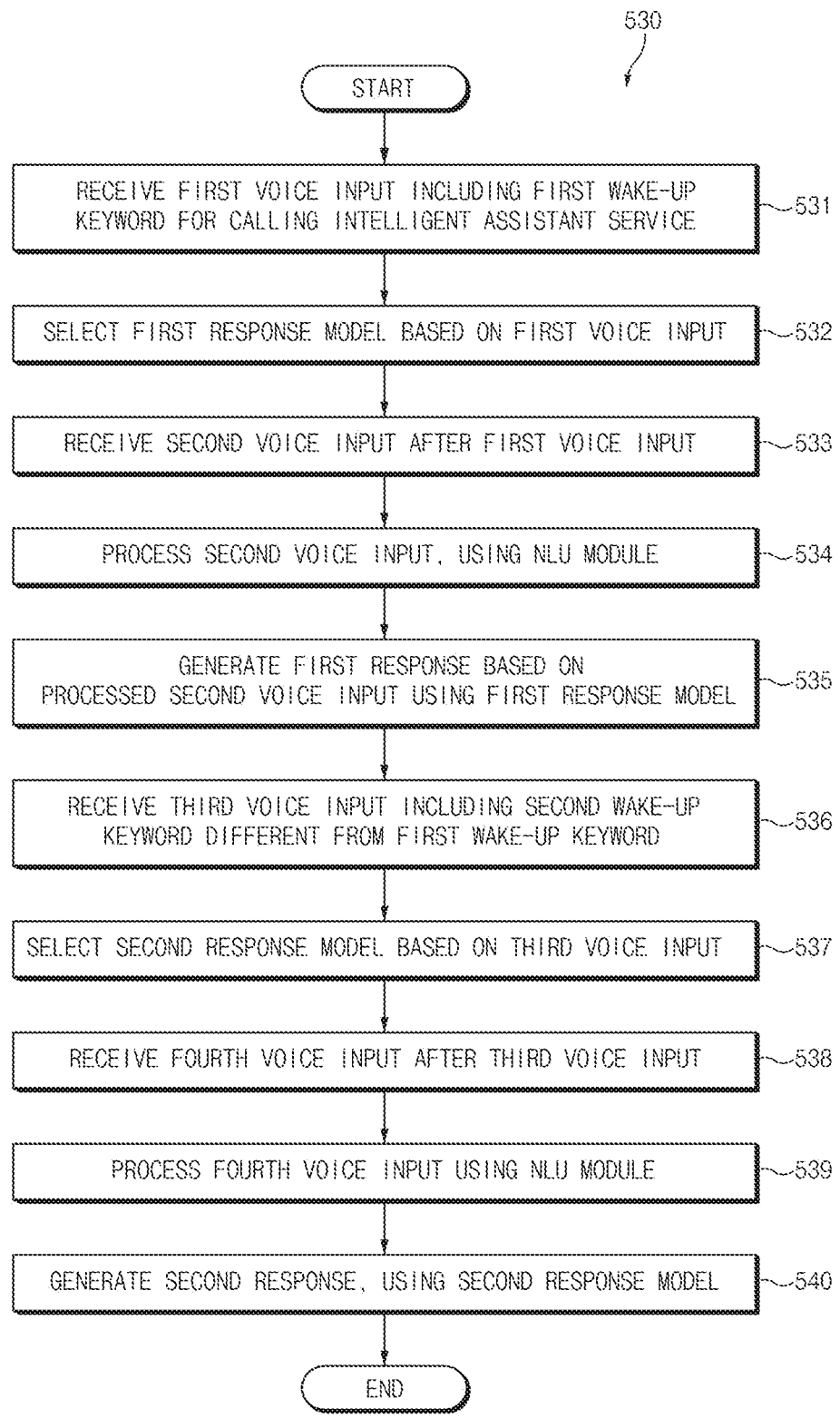
FIG. 4B is a flowchart illustrating an operation of an integrated intelligence system, according to an embodiment of the disclosure.

FIG. 4B is a flowchart 530 illustrating an operation of the integrated intelligence system 500, according to an embodiment of the disclosure.

According to an embodiment, the intelligent server 520 of the integrated intelligence system 500 may provide a response to different wake-up keywords, using different response models.

Referring to FIG. 4B, the intelligent server 520 according to an embodiment may perform a first operation including operation 531 to operation 535.

In operation 531, the intelligent server 520 may receive a first voice input including the first wake-up keyword. The first wake-up keyword may call an intelligent assistant service. The first voice input may be received via a microphone.

In operation 532, the intelligent server 520 may select the first response model based on the first voice input.

In operation 533, the intelligent server 520 may receive a second voice input. The second voice input may be received via the microphone. The second voice input may be received after the first voice input. The second voice input may be a voice input for calculating the first result.

In operation 534, the intelligent server 520 may process a second voice input. The second voice input may be processed using the NLU module 522.

In operation 535, the intelligent server 520 may generate the first response based on the processed second voice input. The first response may be generated using the first response model.

Furthermore, the intelligent server 520 according to an embodiment may perform a second operation including operation 536 to operation 540.

In operation 536, the intelligent server 520 may receive a third voice input including a second wake-up keyword different from the first wake-up keyword. The third voice input may be received via the microphone.

In operation 537, the intelligent server 520 may select the second response model based on the third voice input.

In operation 538, the intelligent server 520 may receive a fourth voice input. The fourth voice input may be received after the third voice input. The fourth voice input may be received via the microphone.

In operation 539, the intelligent server 520 may process the fourth voice input. The fourth voice input may be processed using the NLU module 522.

In operation 540, the intelligent server 520 may generate the second response based on the processed fourth voice input. The second response may be generated using the second response model.

Figure 5A:
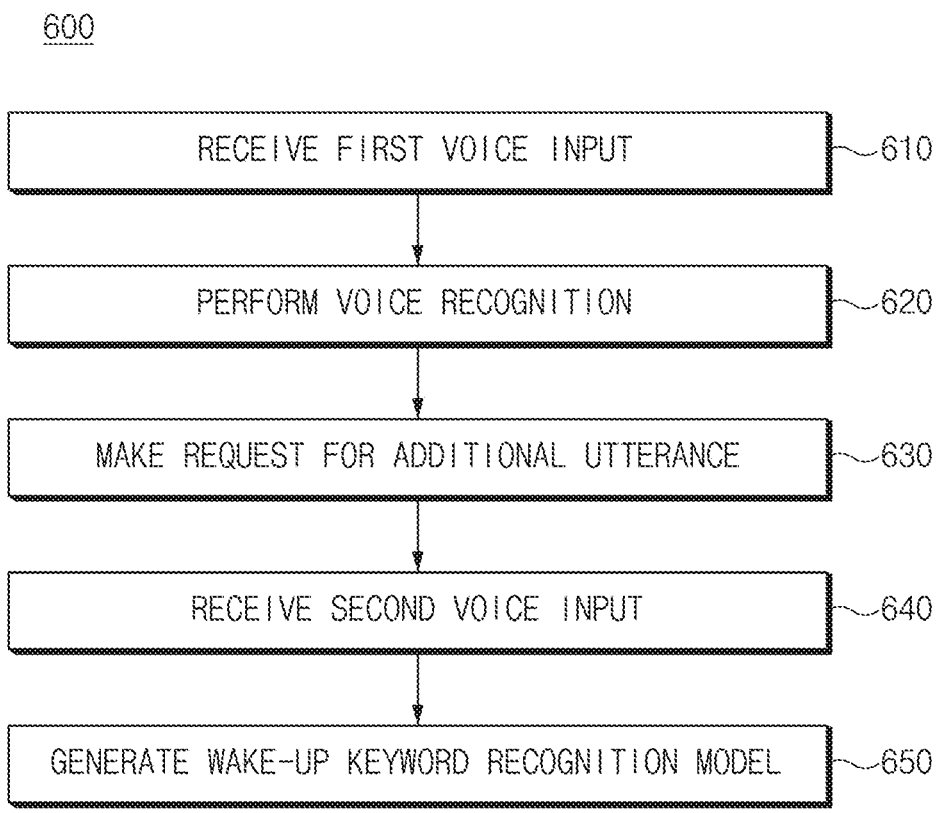
FIG. 5A is a flowchart illustrating a method in which an integrated intelligence system registers a wake-up keyword, according to an embodiment of the disclosure.

FIG. 5A is a flowchart 600 illustrating a method in which an integrated intelligence system 500 registers a wake-up keyword, according to an embodiment of the disclosure.

Referring to FIG. 5A, a user terminal (e.g., the user terminal 510 of FIG. 4A) may determine whether an inappropriate word is included in a voice input, through an intelligent server (e.g., the intelligent server 520 of FIG. 4A) and may register a wake-up keyword.

According to an embodiment, in operation 610, the user terminal may receive a first voice input for registering the wake-up keyword. For example, the user terminal may receive "galaxy". According to an embodiment, the user terminal may transmit the received first voice input to the intelligent server.

According to an embodiment, in operation 620, the intelligent server may recognize the received first voice input. For example, the intelligent server may convert the first voice input into text data (e.g., galaxy) through an ASR module (e.g., the ASR module 521 of FIG. 4A) to recognize the first voice input.

According to an embodiment, in operation 630, the user terminal may make a request for an additional utterance for wake-up keyword recognition training. For example, the user terminal may output first guide information (e.g., please say 'galaxy' again.) for receiving a second voice input the same as the first voice input (e.g., galaxy), via a speaker or a display. For example, the first guide information may be generated using the first voice input. According to an embodiment, the user terminal may receive the first guide information from the intelligent server. The intelligent server may generate the first guide information, using the first voice input received from the user terminal.

According to an embodiment, in operation 640, the user terminal may receive the second voice input including information the same as the first voice input. For example, the user terminal may receive "galaxy" again.

According to an embodiment, in operation 650, the user terminal may generate a wake-up keyword recognition model for recognizing a wake-up keyword, based on the first voice input and the second voice input For example, the wake-up keyword recognition model may be generated using model training based on at least one of a HMI algorithm or a neural network algorithm or an adaptation training algorithm. According to an embodiment, the user terminal may register the wake-up keyword by storing the generated wake-up keyword recognition model in the memory.

According to an embodiment, in operation 640, the user terminal may receive the voice input including information the same as the first voice input a plurality of times (e.g., N times) According to an embodiment, in operation 650, the user terminal may generate a wake-up keyword recognition model based on a plurality of voice inputs. Accordingly, the user terminal may generate the wake-up keyword recognition model capable of accurately recognizing the wake-up keyword.

Accordingly, when receiving a voice input including the registered wake-up keyword in a standby state, the user terminal may recognize the wake-up keyword and may change the state of a speech recognition service (or a voice-based intelligent assistant service) to an activation state.

Figure 5B:
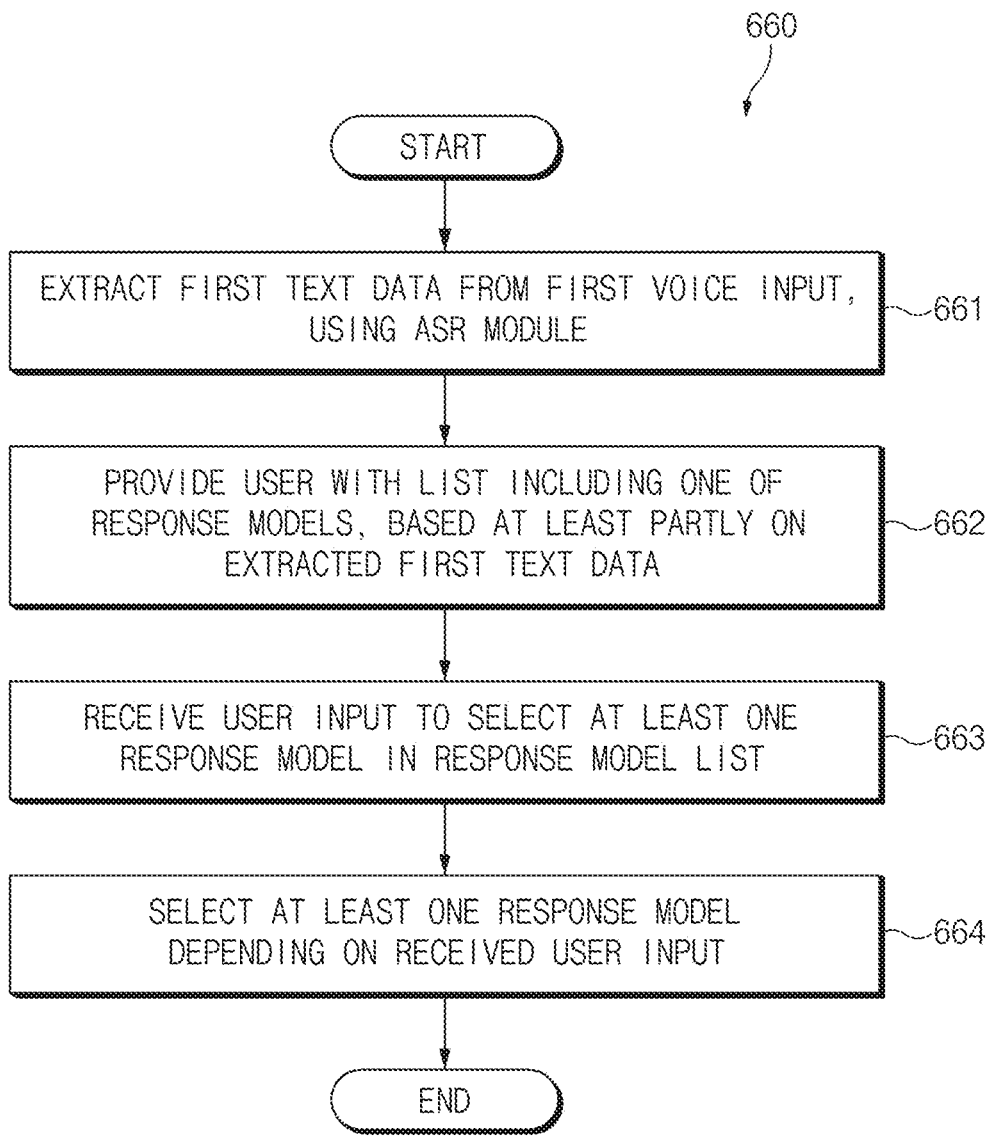
FIG. 5B is a flowchart illustrating an operation of an integrated intelligence system, according to an embodiment of the disclosure.

FIG. 5B is a flowchart 660 illustrating an operation of the integrated intelligence system 500, according to an embodiment of the disclosure.

Referring to FIG. 5B, in operation 661, the intelligent server 520 may extract first text data from a first voice input, using the ASR module 521. In operation 610, the first voice input may be received using a microphone.

In operation 662, the intelligent server 520 may provide a user with a list including at least one of response models, based at least partly on the extracted first text data.

In operation 663, the intelligent server 520 may receive a user input to select at least one response model in a response model list.

In operation 664, the intelligent server 520 may select at least one response model depending on the received user input.

Figure 6A:
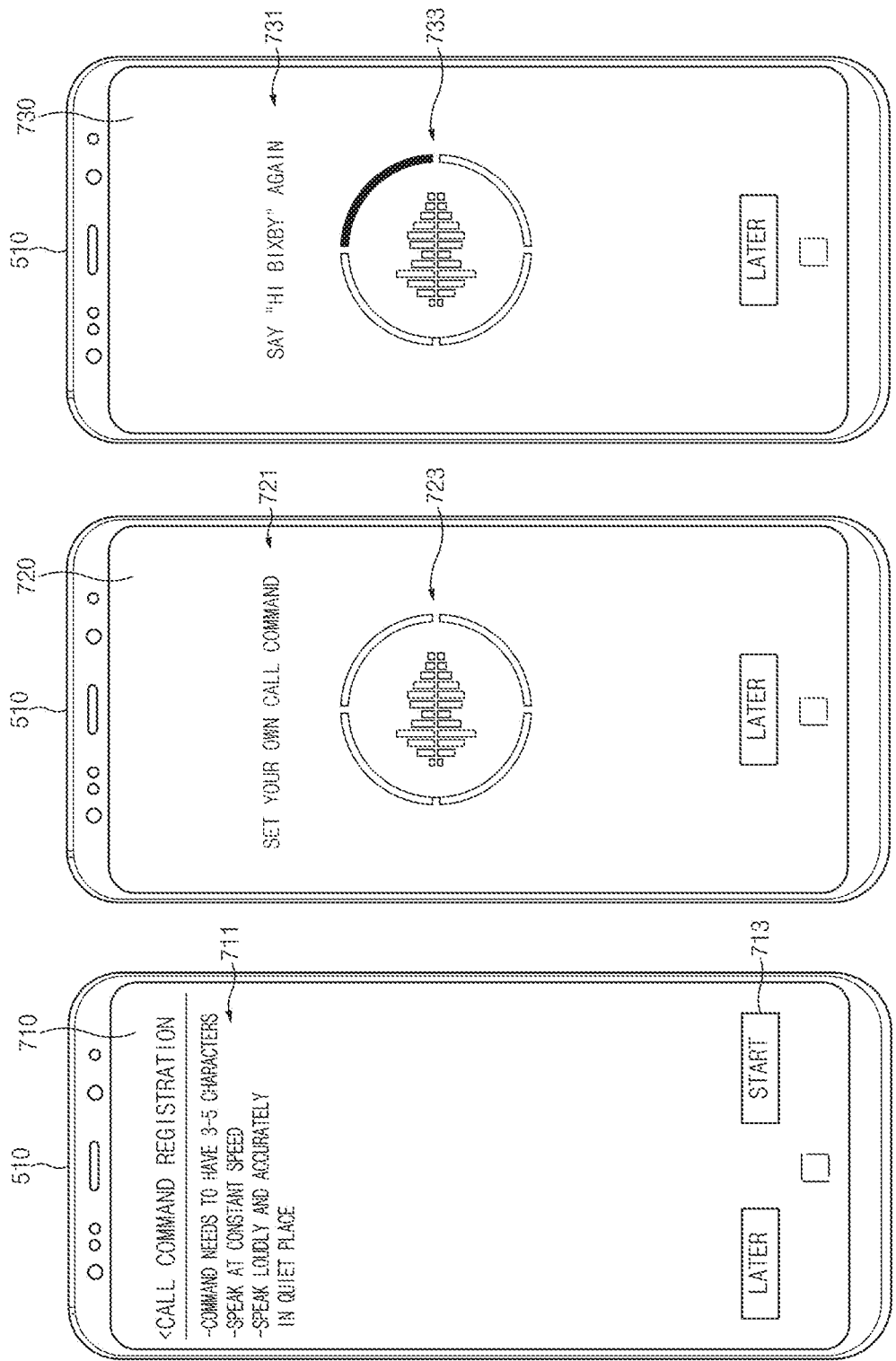
FIGS. 6A and 6B are views illustrating a screen in which a user terminal registers a wake-up keyword, according to various embodiments of the disclosure.
Figure 6B:
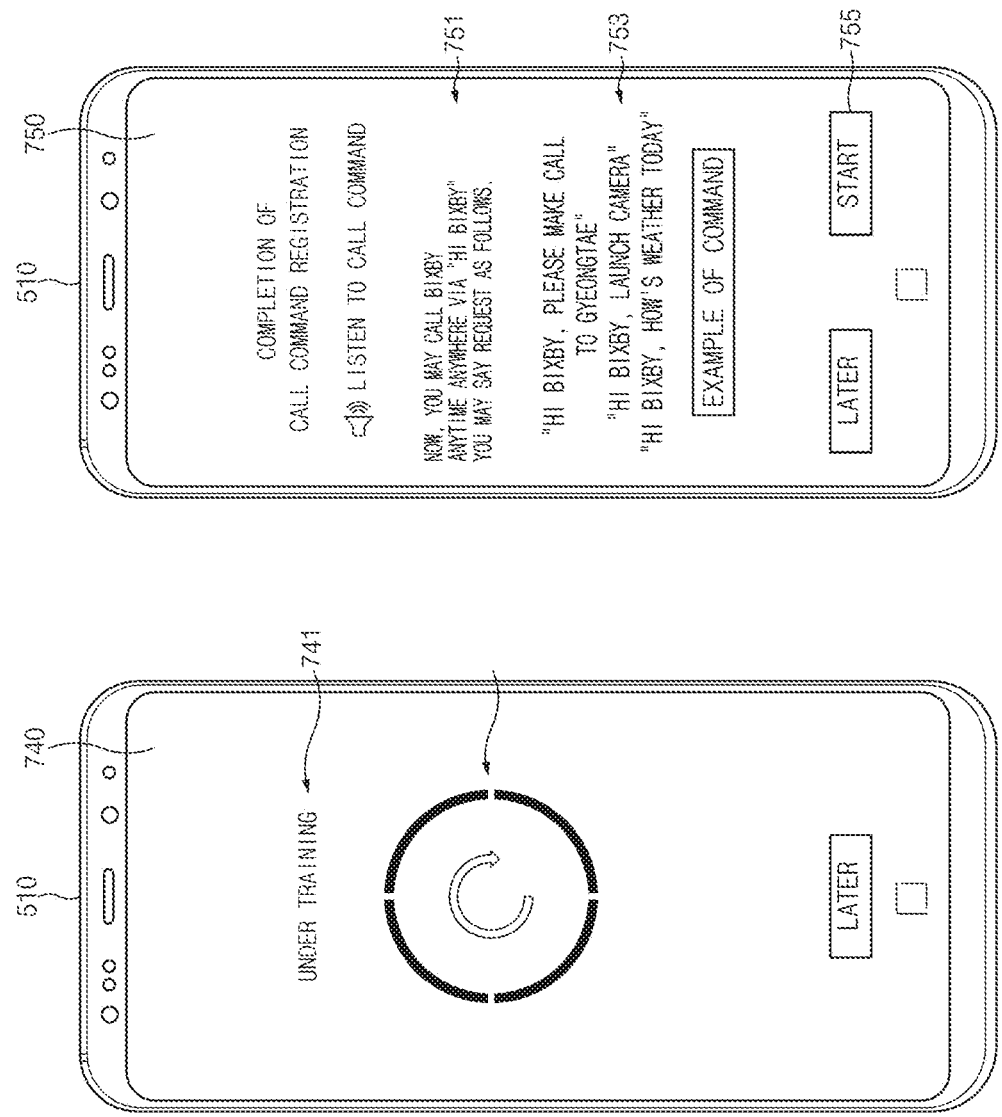

FIGS. 6A and 6B are views illustrating a screen in which a user terminal registers a wake-up keyword, according to various embodiments of the disclosure.

Referring to FIGS. 6A and 6B, the user terminal 510 may output a user interface (UI) for registering a wake-up keyword, via a display (e.g., the display 140 of FIG. 1).

According to an embodiment, in screen 710, the user terminal 510 may output a UI for starting to register the wake-up keyword. The user terminal 510 may display guide information 711 of a user utterance for registering a wake-up keyword, on the UI. According to an embodiment, the user terminal 510 may receive a user input to start the registration of the wake-up keyword, through an object (e.g., a virtual button 713).

According to an embodiment, in screen 720, the user terminal 510 may receive a UI for receiving a first voice input to register the wake-up keyword, in a step of performing operation 610 of FIG. 5A. The user terminal 510 may display first guide information 721 for receiving the first voice input and an indicator 723 for displaying a wake-up keyword registration step, on the UI. The indicator 723 may indicate the step of receiving the first voice input. According to an embodiment, the user terminal 510 may receive the first voice input. For example, the user terminal 510 may receive "Hi Bixby!". According to an embodiment, the user terminal 510 may determine whether the first voice input includes a specified word, through an intelligent server (e.g., the intelligent server 520 of FIG. 4A).

According to an embodiment, in screen 730, the user terminal 510 may output a UI for receiving a second voice input including a word the same as the first voice input, in the step of performing operation 630 of FIG. 5A. The user terminal 510 may display second guide information 731 for receiving the second voice input and an indicator 733 indicating the step of receiving the second voice input, on the UI. For example, the second guide information 731 may include text data (e.g., Hi Bixby) corresponding to the first voice input. According to an embodiment, the user terminal 510 may receive a second voice input. For example, the user terminal 510 may receive "Hi Bixby!" again.

According to an embodiment, in screen 740, the user terminal 510 may output a UI indicating the procedure of performing wake-up keyword recognition training, in the step of performing operation 650 of FIG. 5A. The user terminal 510 may display third guide information 741 indicating that the user terminal 510 is under training and an indicator 743 indicating a training step, on the UI. According to an embodiment, the user terminal 510 may register the wake-up keyword based on the first voice input and the second voice input. For example, the user terminal 510 may generate a wake-up keyword recognition model based on the first voice input and the second voice input. The user terminal 510 may store the generated wake-up keyword recognition model in a memory (e.g., the memory 511 of FIG. 4A).

According to an embodiment, in screen 750, the user terminal 510 may output a UI indicating the result of registering the wake-up keyword. The user terminal 510 may display third guide information 751 including the result of registering the wake-up keyword and an illustration 753 of a voice input to perform a specified function, on the UI. According to an embodiment, the user terminal 510 may receive a user input to complete the registration of the wake-up keyword, through an object (e.g., a virtual button 755).

Accordingly, when recognizing the registered wake-up keyword, the user terminal may change the state of a speech recognition service (or a voice-based intelligent assistant service) from a standby state to an activation state.

Figure 7:
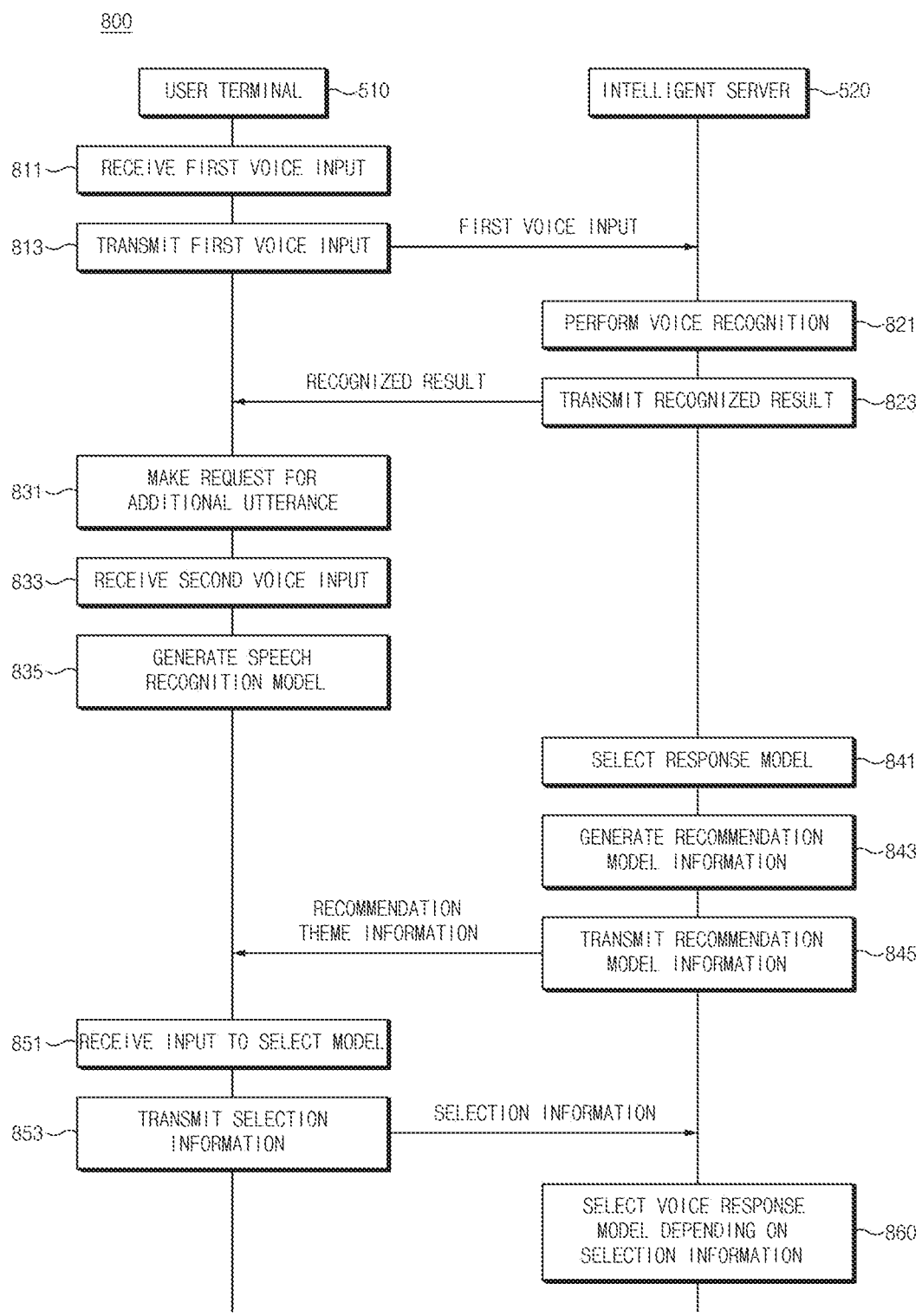
FIG. 7 is a flowchart illustrating a method in which an integrated intelligence system sets a response model, according to an embodiment of the disclosure.

FIG. 7 is a flowchart 800 illustrating a method in which an integrated intelligence system sets a response model, according to an embodiment of the disclosure.

Referring to FIG. 7, an integrated intelligence system (e.g., the integrated intelligence system 500 of FIG. 4A) may determine a response model based on the registered wake-up keyword.

According to an embodiment, in operation 811, the user terminal 510 may receive a first voice input, similarly to operation 610 of FIG. 5A. For example, the user terminal 510 may receive "Secretary Kim". According to an embodiment, in operation 813, the user terminal 510 may transmit the received first voice input to the intelligent server 520.

According to an embodiment, in operation 821, the intelligent server 520 may perform voice recognition on the first voice input, similarly to operation 620 of FIG. 5A. For example, the intelligent server 520 may change the first voice input to 'Secretary Kim' that is text data. According to an embodiment, in operation 823, the intelligent server 520 may transmit the recognized result to the user terminal 510. For example, the recognized result may include the text data (e.g., 'Secretary Kim') corresponding to the first voice input.

According to an embodiment, in operation 831, the user terminal 510 may make a request for an additional utterance to a user, similarly to operation 630 of FIG. 5A. For example, the user terminal 510 may output "please utter Secretary Kim three times". According to an embodiment, in operation 833, the user terminal 510 may receive a second voice input the same as the first voice input, similarly to operation 640 of FIG. 5A. Moreover, the user terminal 510 may receive a plurality of voice inputs, each of which is the same as the first voice input. According to an embodiment, in operation 835, the user terminal 510 may generate a speech recognition model based on the first voice input and the second voice input, similarly to operation 650 of FIG. 5A. In other words, the user terminal 510 may train the speech recognition model. For example, the user terminal 510 may generate the speech recognition model corresponding to "Secretary Kim".

According to an embodiment, in operation 841 to operation 845, the intelligent server 520 may select a response model when the user terminal 510 trains the speech recognition model. According to an embodiment, in operation 841, the intelligent server 520 may select the response model based on the recognized wake-up keyword. For example, the intelligent server 520 may select a response model (e.g., a response model of a careful and polite assistant, a response model of a sporty and chatty girlfriend, a response model of a warm-hearted and tender boyfriend, or the like) similar to the meaning of "Secretary Kim". According to an embodiment, in operation 843, the intelligent server 520 may generate information about a recommendation model (or recommendation response model). For example, the recommendation model information may include a recommendation model list. The list may include the selected at least one response model. According to an embodiment, in operation 845, the intelligent server 520 may transmit the generated recommendation model information to the user terminal 510.

According to an embodiment, in operation 851, the user terminal 510 may receive a user input to select a response model. For example, the user terminal 510 may receive a user input to select at least one voice response (e.g., a response of a careful and polite assistant) in at least one response model included in the recommendation model list. According to an embodiment, in operation 853, the user terminal 510 may transmit selection information by a user input, to the intelligent server 520.

According to an embodiment, in operation 860, the intelligent server 520 may set the response model corresponding to the selection information. For example, the intelligent server 520 may be set to generate the response using a response model corresponding to the selection information. Accordingly, the intelligent server 520 may generate the response corresponding to the received voice input using the set voice response model.

Figure 8:
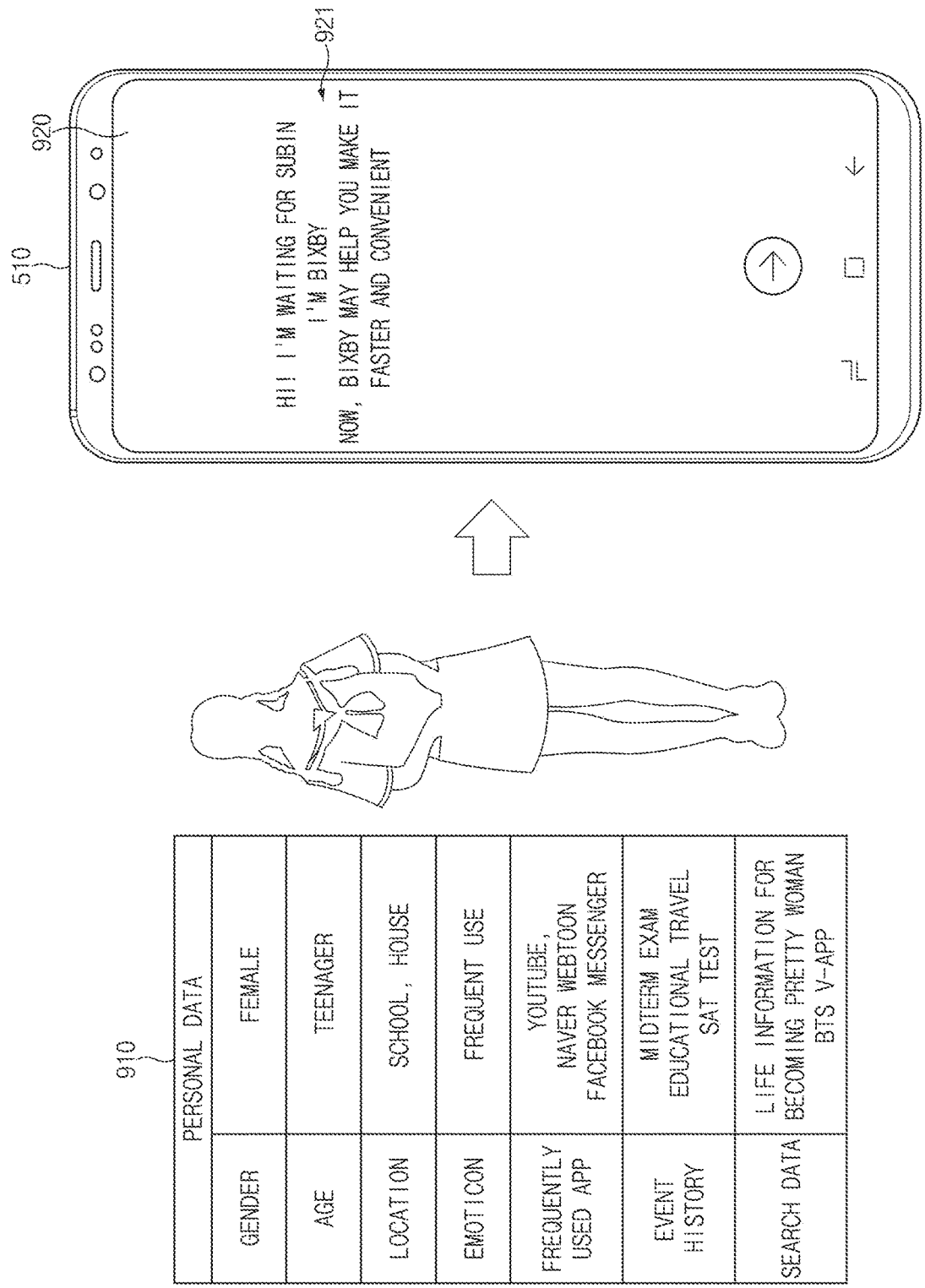
FIG. 8 is a view illustrating a method in which an integrated intelligence system sets an initial response model of a user terminal, according to an embodiment of the disclosure.

FIG. 8 is a view illustrating a method in which an integrated intelligence system sets an initial response model of a user terminal, according to an embodiment of the disclosure.

Referring to FIG. 8, an integrated intelligence system (e.g., the integrated intelligence system 500 of FIG. 4A) may output guide information for setting a response model, using user information at out-of-box experience (OOBE) of the user terminal 510.

According to an embodiment, the user terminal 510 may output guide information so as to set a response model using information 910 about the logged-in user. For example, the user terminal 510 may provide the user with text information 921 for guiding a response model, through a UI 920 determined based on user information. Furthermore, the user terminal 510 may provide the user with voice information for guiding a response model. The color (e.g., bright color) of the UI 920 for guiding to set the response model, the writing style (e.g., friendly writing style) of the text information 921, the tone (e.g., friendly tone) of the voice information may be determined based on user information. According to an embodiment, the user information may include not only personal information of the user but also user preference information. For example, the user information may include a gender (e.g., female), an age (e.g., teenager), a location (e.g., a school and a house), a frequently used app (e.g., YouTube or Facebook), an event history (e.g., midterm exam), and search data (e.g., V-app).

Figure 9A:
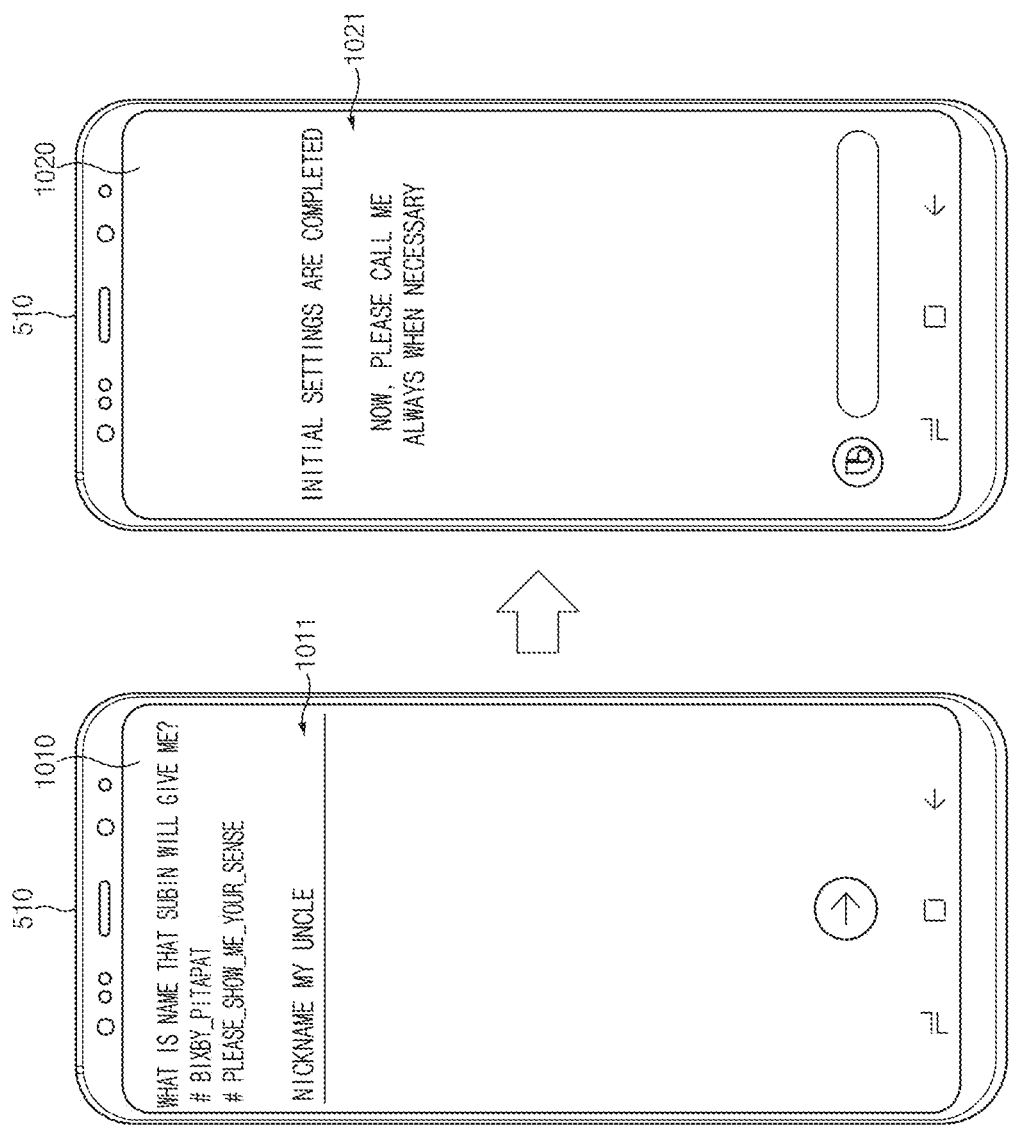
FIGS. 9A and 9B are views illustrating a method in which an integrated intelligence system sets an initial response model of a user terminal, according to various embodiments of the disclosure.
Figure 9B:
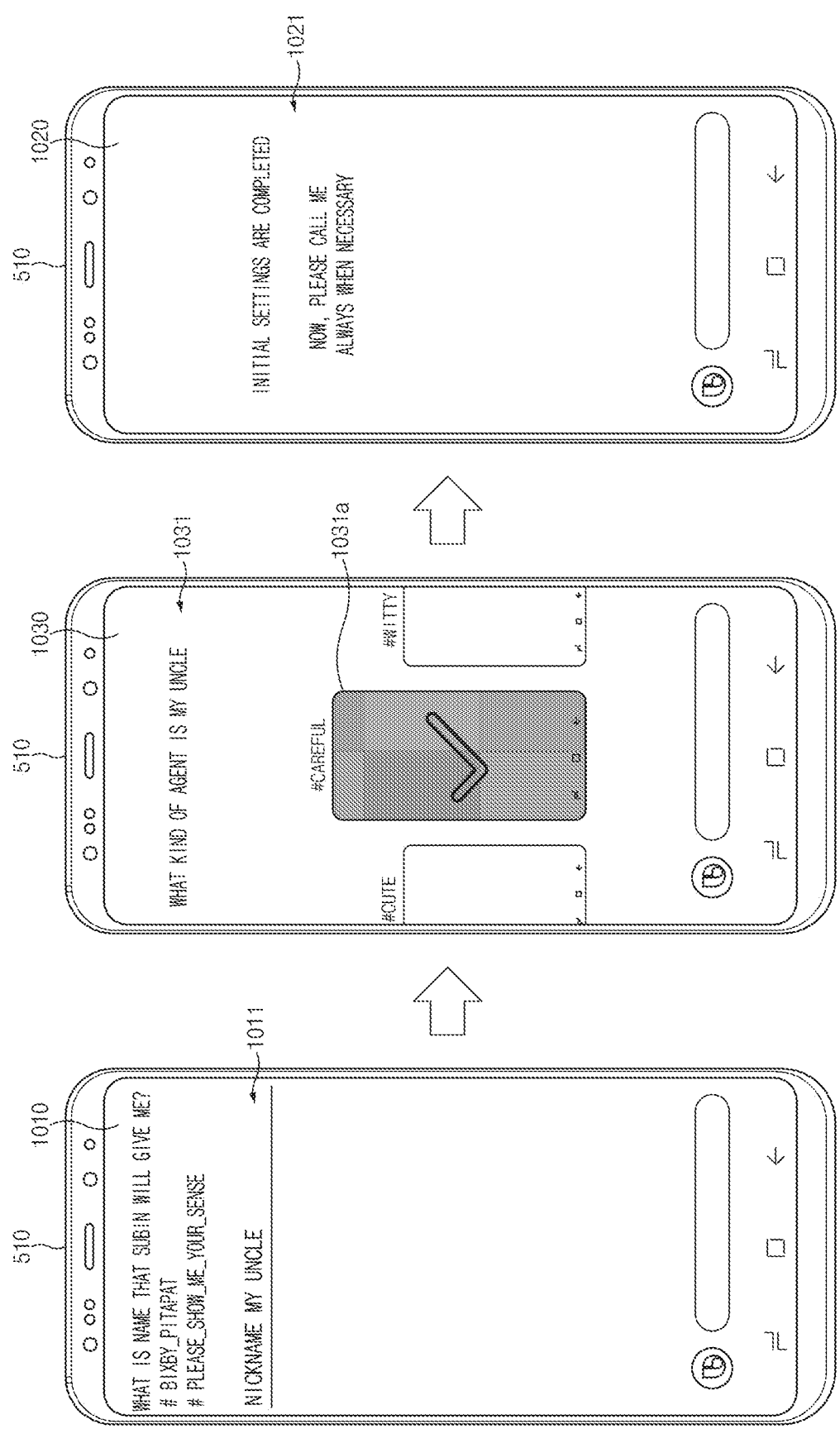

FIGS. 9A and 9B are views illustrating a method in which an integrated intelligence system sets an initial response model of a user terminal, according to various embodiment of the disclosure.

Referring to FIG. 9A, an integrated intelligence system (e.g., the integrated intelligence system 500 of FIG. 4A) may receive a user input for setting a wake-up keyword at the OOBE of the user terminal 510.

According to an embodiment, the user terminal 510 may display a user interface (UI) 1010 for entering a wake-up keyword, on a display. The color (e.g., bright color) of the UI 1010 displayed on the display may be determined based on user information. According to an embodiment, the user terminal 510 may receive a user input 1011 to enter a wake-up keyword, through the UI 1010 displayed on the display. For example, the user input 1011 may be received by directly entering text data (e.g., my uncle). According to an embodiment, the entered text data may be used as a wake-up name as it is.

According to an embodiment, an intelligent server (e.g., the intelligent server 520 of FIG. 4A) may select a response model based on the received user input 1011. Moreover, the intelligent server may select the response model, using the user information together with the user input 1011. According to an embodiment, the intelligent server may provide a response, using the selected response model. According to an embodiment, the user terminal 510 may display a user interface (UI) 1020 on the display based on the selected response model. The user terminal 510 may display text information 1021 for guiding the response model selected through the UI 1020. The color (e.g., dark color) of the UI 1010, the writing style (e.g., formal writing style) of the text information 1021, the tone (e.g., formal tone) of the voice information may be determined depending on the selected response model.

Referring to FIG. 9B, the integrated intelligence system may receive a user input to select a response model at the OOBE of the user terminal 510.

According to an embodiment, the user terminal 510 may display the UI 1010 for entering a wake-up keyword, on the display. According to an embodiment, the user terminal 510 may receive the user input 1011 to enter a wake-up keyword, through the UI 1010 displayed on the display.

According to an embodiment, the intelligent server may transmit a list including at least one response model to the user terminal 510 so as to select at least one response model based on the received user input 1011. According to an embodiment, the user terminal 510 may display a list 1031 for receiving a user input to select a response model on a user interface (UI) 1030 displayed on the display. According to an embodiment, the user terminal 510 may receive a user input 1031a to select a response model, through the list 1031 displayed on the display. According to an embodiment, the user terminal 510 may transmit the received user input 1031a to the intelligent server.

According to an embodiment, the intelligent server may set the response model depending on the received user input 1031a. According to an embodiment, the intelligent server may provide a response, using the set response model. According to an embodiment, the user terminal 510 may display the UI 1020 on the display based on the selected response model.

Figure 10A:
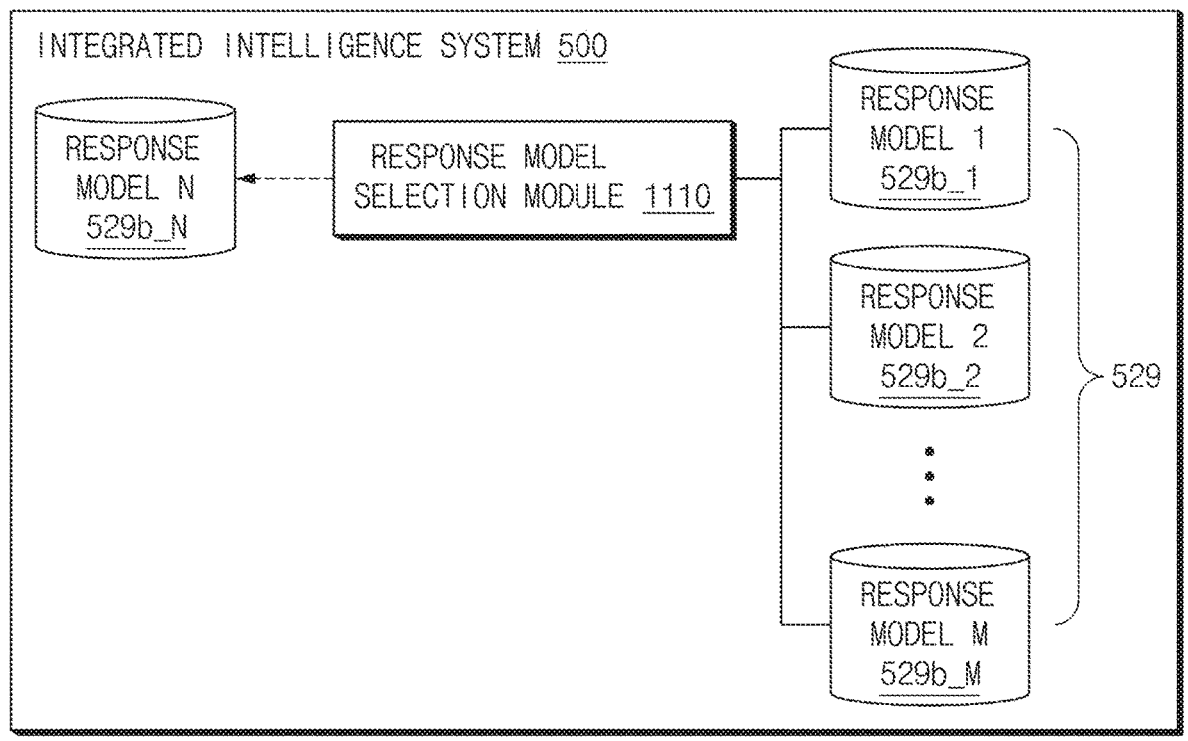
FIGS. 10A and 10B are views illustrating a method in which a response model is set in an integrated intelligence system, according to various embodiments of the disclosure.
Figure 10B:
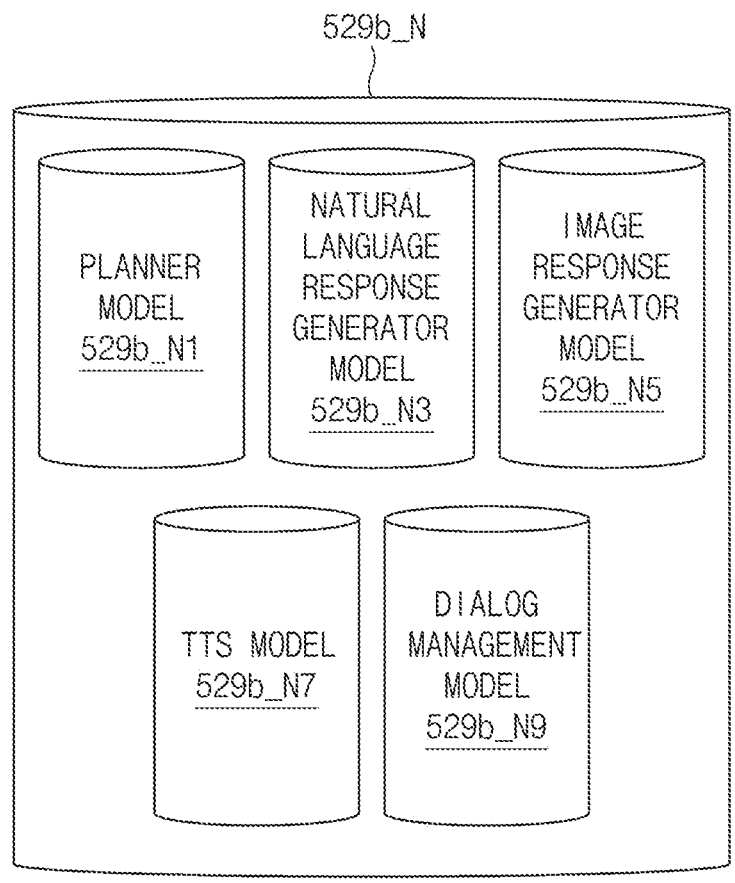

FIGS. 10A and 10B are views illustrating a method in which a response model is set in an integrated intelligence system, according to various embodiments of the disclosure.

Referring to FIG. 10A, a response model 529b_N selected based on a wake-up keyword may be set in an integrated intelligence system (e.g., the integrated intelligence system 500 of FIG. 4A).

According to an embodiment, a response model selection module 1110 may be implemented with at least part of a plurality of components of an intelligent server (e.g., the intelligent server 520 of FIG. 4A). In other words, the function of the response model selection module 1110 may be implemented through at least part of the plurality of components of the intelligent server.

According to an embodiment, the response model selection module 1110 may select a response model 529b_N based on the wake-up keyword. For example, the response model selection module 1110 may select the at least one response model 529b_N of a plurality of response models 529b_1 to 529b_M (cumulatively shown as 529 in FIG. 10A, inclusive of 529b_2) based on the wake-up keyword. For example, the plurality of response models 529b_1 to 529b_M may be stored in the response model DB 529b. In detail, a method of selecting the response model 529b_N based on the wake-up keyword will be described with reference to FIG. 11.

According to an embodiment, the response model selection module 1110 may set the selected response model 529b_N in the integrated intelligence system 500. Accordingly, the integrated intelligence system 500 may generate a response corresponding to the received user input, using the set response model 529b_N.

Referring to FIG. 10B, the selected response model 529b_N may include a model for each component included in the integrated intelligence system 500.

According to an embodiment, the response model 529b_N may include a model for each component included in the intelligent server. For example, the response model 529b_N may include at least one or more of a planner model 529b_N1, a natural language response generator model 529b_N3, an image response generator model 529b_N5, a TTS model 529b_N7, or a dialog management model 529b_N9.

According to an embodiment, the planner model 529b_N1 may be used when the planner module 523 of the intelligent server generates a plan. For example, the plan may be generated based on the intent of the received voice input. The plan may include a plurality of actions executed by the user terminal 100. According to an embodiment, the planner module 523 may generate the plan depending on the planner model 529b_N1. For example, the planner module 523 may generate a plan for executing the specified app or for performing the specified function, depending on the planner model 529b_N1. In other words, the planner module 523 may generate a plan for executing different apps with respect to the same intent or for performing different functions on the same intent, depending on the planner model 529b_N1 of the selected response model 529b_N. According to an embodiment, the planner model 529b_N1 may include information about the specified app or function.

According to an embodiment, the natural language response generator model 529b_N3 may be used when the natural language response generator module 524 of the intelligent server 520 generates the response including natural language information. For example, the response may be generated based on the intent of the received voice input. According to an embodiment, the natural language response generator module 524 may generate a response in a specified form depending on the natural language response generator model 529b_N3. For example, the natural language response generator module 524 may generate the response including a symbol (e.g., emoticon) to be displayed on a screen or a natural language response (text), depending on the natural language response generator model 529b_N3. In other words, the natural language response generator module 524 may generate the natural language response including different symbols and/or texts with respect to the same intent, depending on the natural language response generator model 529b_N3 of the selected response model 529b_N. According to an embodiment, the natural language response generator model 529b_N3 may include a rule for generating a specific response. For example, the rule may include a natural language response (e.g., image and/or text) to be included in the screen. The natural language response to be included in the screen may include a symbol expression rule indicating an emoticon. According to an embodiment, the rule may be set depending on the mode used by a user. For example, the mode used by the user may include an eyes-free mode, a hands-free mode, and a screen mode. According to an embodiment, a plurality of rules may correspond to one response (or response identification (ID)).

associated with a chat, a half-honorific title, a recommendation function, and/or an emoticon may be assigned.

TABLE 2

| Comment #10-2 | dialogue #10-2-1 (Display) | dialogue #10-2-1 (Spoken) | dialogue #10-2-2 (Display) | dialogue #10-2-2 (Spoken) |
|---|---|---|---|---|
| [My uncle] Firm and short. Neat expression. | Please select the desired method of payment. | Please select the desired method of payment. | Please determine which method of payment is made. | Please determine which method of payment is made. |
| [My uncle] Firm and short. Neat expression. | Please press the desired payment button. | Please press the payment button. | Please press the payment button to complete the order. | Please press the payment button to complete the order. |

As illustrated in Table 2, when the comment theme of each response ID is changed, a plurality of dialogue displays and/or other rules associated with the utterance (spoken) may be assigned. For example, when the comment theme is "my uncle", the dialogue display or the utterance rules may be assigned to the firm and short expression and/or the neat expression for the same situation. According to an embodiment, the image response generator model 529b_N5 may be used when the image response generator module 525 of the intelligent server 520 generates a response including image information. For example, the response may be generated based on the intent of the received voice input. According to an embodiment, the image response generator module 525 may generate the response in the specified form, depending on the image response generator model 529b_N5. For

TABLE 1

| NLG ID | NLG ver. | Comment #10-1 | dialogue #10-1-1 (Display) | dialogue #10-1-1 (Spoken) | dialogue #10-1-2 (Display) | dialogue #10-1-2 (Spoken) |
|---|---|---|---|---|---|---|
| Starbucks_10_CreateOrder_paymentOption_Exist_No | 0.9 | [Borong-yi] Chat, Half-honorific title, Recommendation function | What do you use to make a payment? Do you want to make a payment using the payment means used for the last time? | What do you use to make a payment? Do you want to make a payment using the payment means used for the last time? % smile | Now, let's make a payment? This? | Now, let's make a payment? This? % question |
| Starbucks_11_CreateOrderDTStore_Exist_Yes | 0.8 | [Borong-yi] Chat, Half-honorific title, Emoticon | Have you decided on #MenuName? Then, press a payment button | Have you decided on #MenuName? % Now Then, press a payment button % wink | Done. Press a payment button | Done. Press a payment button % wink |

As illustrated in Table 1, the NLG module 227 may have at least one response ID. For example, the NLG module 227 may have response IDs of Starbucks 10 and Starbucks 11. The corresponding natural language generation version, a comment theme, a plurality of dialogue displays, and/or other rules associated with an utterance (spoken) may be assigned to each ID. For example, when the comment theme is "Borong-yi", the dialogue display or the utterance rules example, the image response generator module 525 may select content or may generate a response of the type and color of the specified window, depending on the image response generator model 529b_N5. In other words, the image response generator module 525 may select different pieces of content with respect to the same intent or may generate a response of the type and color of a different window with respect to the same intent, depending on the image response generator model 529b_N5 of the selected response model 529b_N. According to an embodiment, the image response generator model 529b_N5 may include a content selection rule or information about the default type and color of the window.

The type and color of the window included in the image response generator model 529b_N5 may be selected or used when the response to a user command is generated. In addition, the default type and/or color of the window included in the image response generator model 529b_N5 may be used as information for displaying a standby screen, when a screen indicating a standby state is displayed before the user command is entered after the user enters a wake-up keyword.

According to an embodiment, the TTS model 529b_N7 may be used when the TTS module 526 of the intelligent server 520 converts natural language information, which is generated by the natural language response generator module 524, into a voice signal. According to an embodiment, the TTS module 526 may convert the natural language information into the voice signal in a specified form, depending on the TTS model 529b_N7. For example, the TTS module 526 may convert the natural language information into the voice signal, depending on a waveform for each synthesis unit (e.g., a phoneme, a diphone, a triphone, or the like) and a parameter (e.g., a pitch, spectrum, a band noise, an utterance speed, an intonation variation, or the like) included in the TTS model 529b_N7. In other words, the TTS module 526 may convert the same natural language information into a different voice signal, depending on the waveform for each synthesis unit and the parameter, which are included in the selected TTS model 529b_N7. According to an embodiment, the TTS model 529b_N7 may include information about a plurality of waveforms for each synthesis unit and the parameter. For example, the TTS model 529b_N7 may use the plurality of waveforms for each synthesis unit and the parameter set (e.g., the parameter set for synthesizing signals) included in a voice DB, depending on the feature of the voice to be synthesized.

According to an embodiment, the dialog management model 529b_N9 may be used when the dialog management module 527 of the intelligent server 520 manages the flow of dialog. According to an embodiment, the dialog management module 527 may manage the flow of dialog depending on the dialog management model 529b_N9. For example, the dialog management module 527 may determine a response depending on the specified context of the dialog management model 529b_N9. In other words, the dialog management module 527 may determine the different response corresponding to the same user input, depending on the dialog management model 529b_N9 of the selected response model 529b_N. According to an embodiment, the dialog management model 529b_N9 may include information about the specified context.

In an embodiment, a response theme may be determined using the planner model 529b_N1, the natural language response generator model 529b_N3, the image response generator model 529b_N5, the TTS model 529b_N7, and/or the dialog management model 529b_N9 included in the response model 529b_N. Only the part of models included in the response model 529b_N may be used to determine the theme. For example, the remaining models may be used as it is; only the TTS model 529b_N7 may be differently applied depending on the theme. Accordingly, the integrated intelligence system 500 may generate the response corresponding to a user input, using the model included in the selected response model 529b_N.

Figure 11:
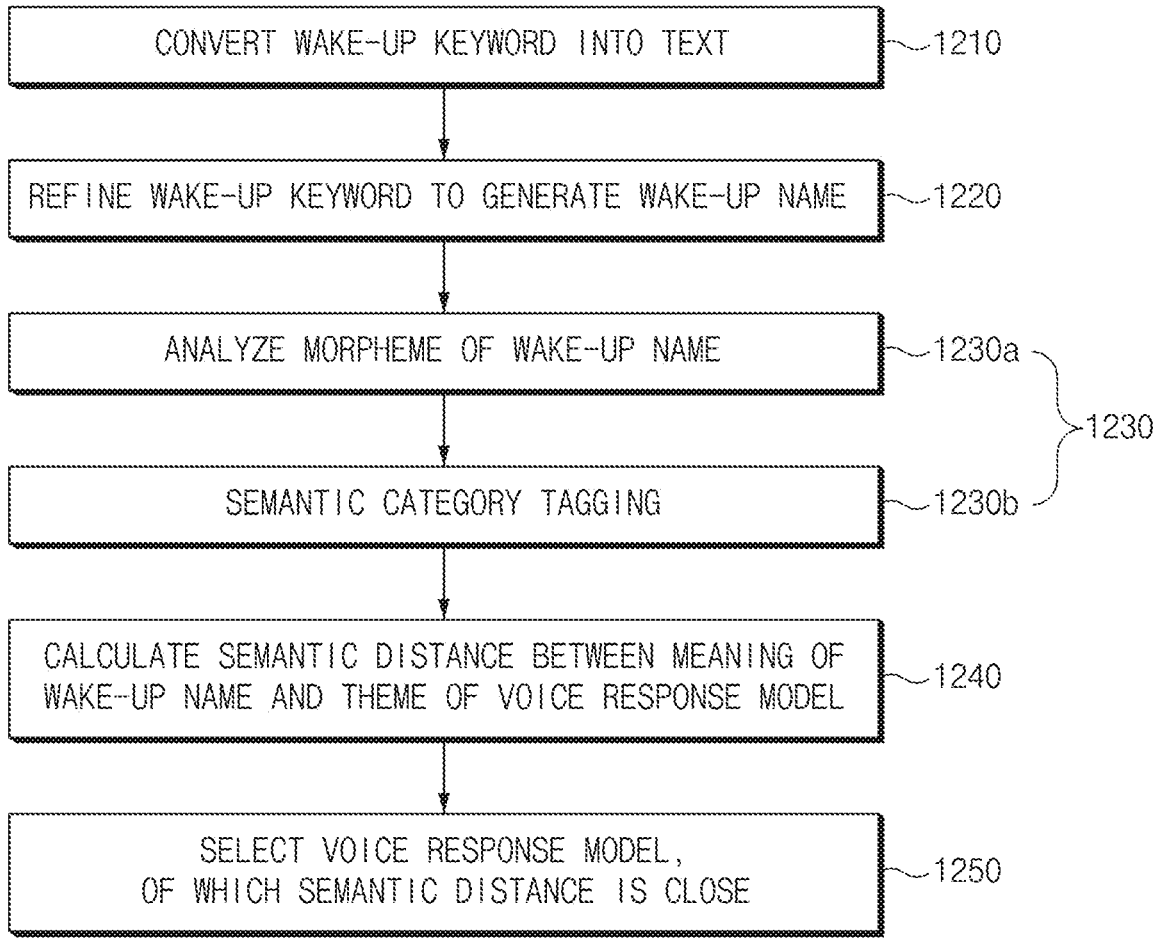
FIG. 11 is a flowchart illustrating a method in which an intelligent server determines a response model, according to an embodiment of the disclosure.

FIG. 11 is a flowchart 1200 illustrating a method in which an intelligent server determines a response model, according to an embodiment of the disclosure.

Referring to FIG. 11, an intelligent server (e.g., the intelligent server 520 of FIG. 4A) may determine a response model based on a wake-up keyword.

According to an embodiment, in operation 1210, an intelligent server (e.g., the ASR module 521 of FIG. 4A) may convert a voice input including the wake-up keyword into text data. For example, the voice input may be a user input to register the wake-up keyword. According to an embodiment, the intelligent server 520 may register the wake-up keyword, using the converted text data.

In an embodiment, as illustrated in the user input 1011 of FIG. 9B, the user may enter the wake-up keyword with a text. When the wake-up keyword is entered with a text, a user input may be completed without a separate change, and in such case, operation 1210 may be omitted.

According to an embodiment, in operation 1220, an intelligent server (e.g., the wake-up keyword refinement module 528 of FIG. 4A) may refine the registered wake-up keyword to generate the wake-up name of the user terminal 510. For example, the wake-up name may be used as a response corresponding to a user input. For example, when the entered wake-up keyword is entered as "Hi Borong-yi", the wake-up keyword refinement module may remove "Hi" determined as an interjection and then may set "Borong-yi" to the wake-up name.

According to an embodiment, in operation 1230, the intelligent server may analyze the meaning of a wake-up name. According to an embodiment, in operation 1230a, the intelligent server may analyze the morpheme of a wake-up name. In other words, the intelligent server may analyze the wake-up name, using linguistic features. According to an embodiment, in operation 1230b, the intelligent server may perform semantic category tagging, using the morpheme of a wake-up name. For example, the semantic category tagging may be performed using various algorithms including a statistical method (e.g., Ciaramita, et al., "Supersense tagging of unknown nouns in WordNet," EMNLP 2003), a rule-based method (e.g., Curran, et al., "Supersense tagging of unknown nouns using semantic similarity," ACL 2005), or the like.

According to an embodiment, in operation 1240, the intelligent server may calculate the semantic distance between the analyzed meaning of the wake-up name and the theme of a response model. For example, the intelligent server may calculate the semantic distance between the analyzed meaning of the wake-up name and the theme of a response model, using the number of redundant tags, the distance of a semantic network, or the like. For example, the theme of the response model may include a semantic category tag. Hereinafter, Table 3 illustrates semantic category tags (e.g., 15 meanings) set for the theme of the response model.

TABLE 3

| Theme_ID | Theme ver. | Semantic_category tags |
|---|---|---|
| Theme_ID_01_Borong | 1.1 | 15chatty, 15cute, 15girl, 15lovely, 15friendly, 15girl |
| Theme_ID_02_MyUncle | 1.0 | 15sober, 15reliable, 15confident, 15reticent, 15attentive, 15gentleman |
| . . . | . . . | . . . |

According to an embodiment, in operation 1250, the intelligent server may select a response model, of which the semantic distance from the wake-up name is close. According to an embodiment, the intelligent server may provide a user with a list including a plurality of response models. For example, the intelligent server may provide the user with a list including a response model, of which the semantic distance is not greater than a specified value. For another example, the intelligent server may provide the user with a list including response models up to the specified rank based on the order in which the semantic distance is close. According to an embodiment, the intelligent server may receive a user input to select at least one of a plurality of response models included in the list. According to an embodiment, the intelligent server may select a response model depending on the user input.

Accordingly, the intelligent server may set the selected response model in the integrated intelligence system 500.

For example, the intelligent server may provide the user with a list including a response model, of which the semantic distance is not less than a specified value. For another example, the intelligent server may provide the user with a list including the above-described specified response model. The intelligent server may receive a user input to select at least one response model through the list. The intelligent server may select the response model corresponding to the received user input.

Figure 12:
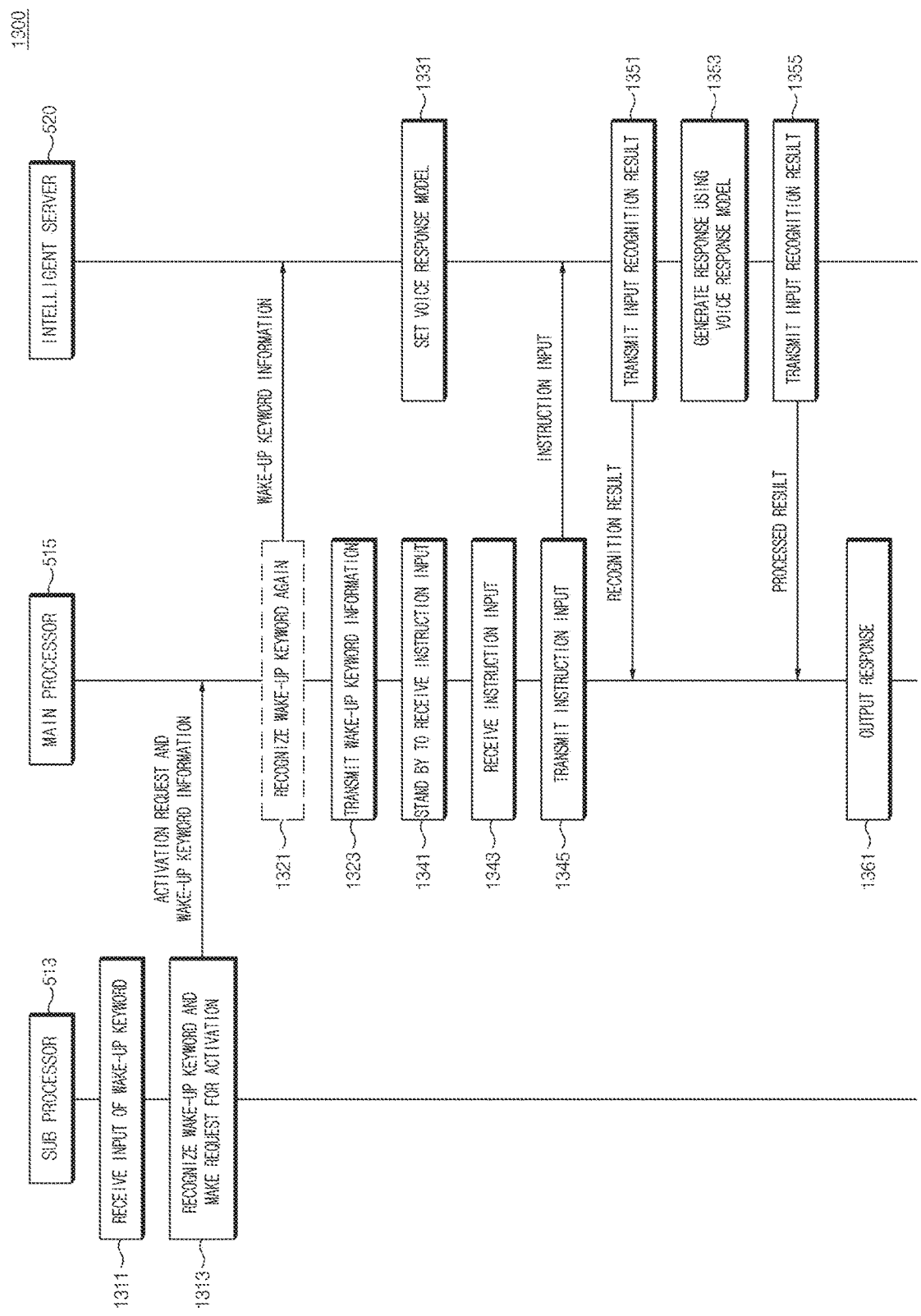
FIG. 12 is a flowchart illustrating a method in which an integrated intelligence system provides a response to a voice input, according to an embodiment of the disclosure.

FIG. 12 is a flowchart 1300 illustrating a method in which the integrated intelligence system 500 provides a response to a voice input, according to an embodiment of the disclosure.

Referring to FIG. 12, the selected response model may be set in the integrated intelligence system 500 based on a wake-up keyword. When receiving a voice input including the wake-up keyword, the user terminal 510 of the integrated intelligence system 500 may activate a speech recognition service or a voice-based intelligent assistant service provided by the user terminal 510.

According to an embodiment, in operation 1311, the sub processor 513 of the user terminal 510 may receive a voice input including a wake-up keyword. For example, the user terminal 510 may receive a voice input including "Secretary Kim".

According to an embodiment, in operation 1313, the sub processor 513 may recognize the wake-up keyword included in a voice input. According to an embodiment, the sub processor 513 may transmit an activation request to the main processor 515 of the user terminal 510. Furthermore, the sub processor 513 may transmit information about the wake-up keyword together with the activation request.

According to an embodiment, in operation 1321, the main processor 515 may again recognize a voice input including the wake-up keyword. The operation in which the main processor 515 recognizes the voice input again may be applied selectively. Because the main processor 515 makes a lot of calculations as compared with the sub processor 513, the main processor 515 may accurately recognize the wake-up keyword. Accordingly, the user terminal 510 may accurately recognize the activation command of a user. According to an embodiment, in operation 1323, the main processor 515 may transmit wake-up keyword information to the intelligent server 520.

According to an embodiment, in operation 1331, the intelligent server 520 may receive information about the wake-up keyword from the user terminal 510 and may set the response model corresponding to the received wake-up keyword.

According to an embodiment, operation 1331 may be replaced by the operation of using the response model determined during the operation of setting the previous wake-up keyword without using the wake-up keyword information transmitted by the user terminal 510. In this case, because there is no need for the wake-up keyword information transmitted by the user terminal 510, operation 1323 may be omitted. According to an embodiment, in operation 1341, the main processor 515 may stand by to receive the voice input including instructions for performing a specified function. According to an embodiment, in operation 1343, the main processor 515 may receive a user input including instructions. For example, the main processor 515 may receive a voice input say that "let me know today's Seoul weather". According to an embodiment, in operation 1345, the main processor 515 may transmit the received voice input to the intelligent server 520.

According to an embodiment, in operation 1351, the intelligent server 520 may recognize the voice input for performing a specified function from the user terminal 510 and may transmit the recognized result to the user terminal 510. According to an embodiment, the intelligent server 520 may convert the voice input into text data. For example, the intelligent server 520 may convert "let me know today's Seoul weather!" into text data. The user terminal 510 may provide the user with the recognized text data.

According to an embodiment, in operation 1353, the intelligent server 520 may generate the response corresponding to the received voice input, using the set response model. According to an embodiment, the intelligent server 520 may determine the intent and parameter, based on the converted text data. For example, the intelligent server 520 may determine the intent (e.g., intent=_WEATHER_MESSAGE) for obtaining weather information and the parameter including date (e.g., param.weather.date="2018.2.28") or location (e.g., param.weather.location="seoul"). According to an embodiment, the intelligent server 520 may generate a plan based on the determined intent and the determined parameter. For example, the intelligent server 250 may generate the plan, using the set response model. The intelligent server 520 may generate the result depending on the generated plan. According to an embodiment, the intelligent server 520 may generate the response including the generated result, using the set response model. For example, the intelligent server 520 may generate a natural language response saying that "Secretary Kim tells you the weather. Today's weather will rain in the late afternoon." and may convert the generated natural language response into a voice signal (e.g., the voice of a calm man) through the TTS module 526 of FIG. 4A to generate the response. According to an embodiment, in operation 1355, the intelligent server 520 may transmit the generated response to the user terminal 510.

According to an embodiment, in operation 1361, the main processor 515 of the user terminal 510 may output the received response.

Figure 13:
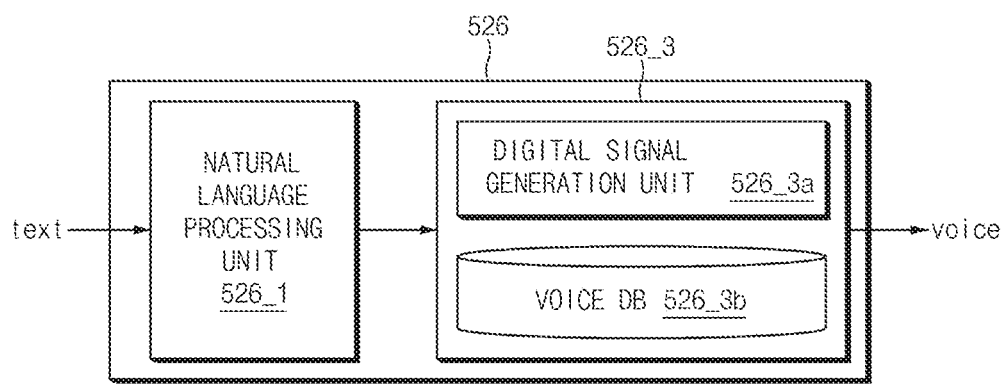
FIG. 13 is a view illustrating an operation of a text-to-speech (TTS) module of an intelligent server, according to an embodiment of the disclosure.

FIG. 13 is a view illustrating an operation of a TTS module of an intelligent server, according to an embodiment of the disclosure.

Referring to FIG. 13, the TTS module 526 of an intelligent server (e.g., the intelligent server 520 of FIG. 4A) may generate a voice signal, using various algorithms. The TTS module 526 may generate the voice signal, using a unit selection synthesis algorithm.

According to an embodiment, the TTS module 526 may include a natural language processing unit 526_1 and a digital signal processing unit 526_3. According to an embodiment, the natural language processing unit 526_1 may determine the unit and attribute, which are necessary for synthesis, based on text data. According to an embodiment, the digital signal processing unit 526_3 may generate the voice signal based on the determined attribute. The digital signal processing unit 526_3 may include a digital signal generation unit 526_3a and a voice database (DB) 526_3b. According to an embodiment, the digital signal generation unit 526_3a may change the parameter necessary to synthesize the voice signal. For example, the digital signal generation unit 526_3a may change at least one of a pitch, an utterance speed (e.g., voice length), and a tone (e.g., spectrum information). According to an embodiment, the voice DB 526_3b may store a voice database collected from a plurality of speakers. Hereinafter, Table 4 illustrates voice information stored in the voice DB 526_3b.

TABLE 4

| Theme ID | Theme ver. | TTS parameter sets | | | |
|---|---|---|---|---|---|
| | | DB | pitch bias | Intonation contrast | speed ... |
| Theme_ID_01_Borong | 1.1 | Suyoun v1.0 | −5 | +5 | +5 ... |
| Theme_ID_02_MyUncle | 1.0 | Jinsoo v2.0 | +10 | 0 | 0 ... |
| ... | ... | ... | ... | ... | ... ... |

According to an embodiment, the TTS module 526 may change the parameter necessary to synthesize a voice signal, depending on the selected response model. For example, when performing a time domain pitch synchronous overlap and add (TD-PSOLA) operation, the digital signal processing unit 526_3 of the TTS module 526 may change the parameter necessary to synthesize a voice signal. According to an embodiment, the TTS module 526 may generate the voice signal depending on the changed parameter. For example, the digital signal processing unit 526_3 may generate the voice signal depending on the changed parameter, using the voice information stored in the voice DB 526_3b.

Figure 14A:
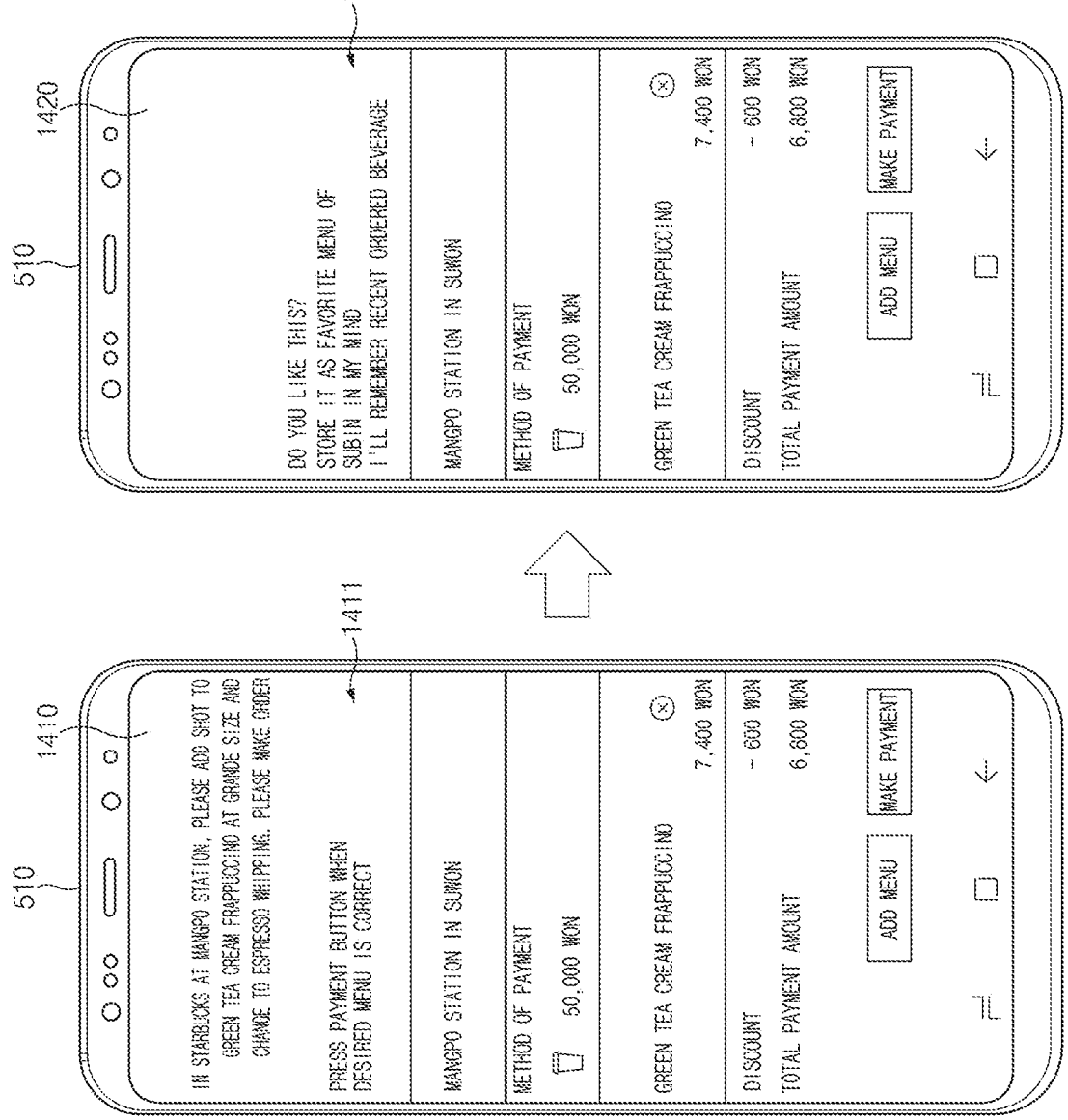
FIGS. 14A and 14B are views illustrating that an integrated intelligence system provides a service according to the selected response model, according to various embodiments of the disclosure.
Figure 14B:
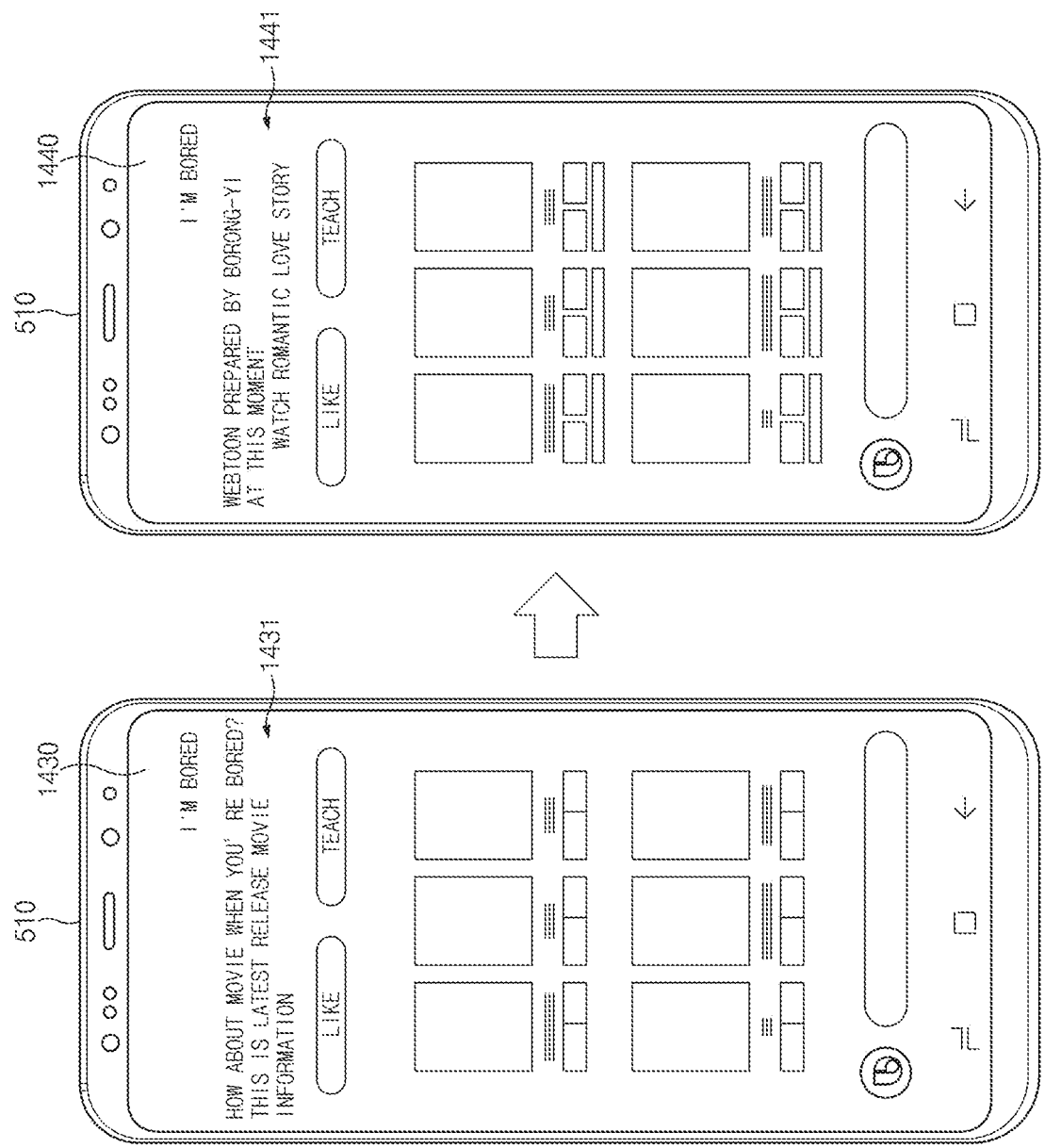

FIGS. 14A and 14B are views illustrating that an integrated intelligence system provides a service according to the selected response model, according to various embodiments of the disclosure.

Referring to FIGS. 14A and 14B, an integrated intelligence system (e.g., the integrated intelligence system 500 of FIG. 4A) may provide the response corresponding to the voice input received depending on the selected voice model.

According to an embodiment, the integrated intelligence system 500 may set a specified response model based on a wake-up keyword. According to an embodiment, the integrated intelligence system 500 may store information about a plurality of response models. According to an embodiment, the information of a response model may include information necessary to generate a response. For example, the information of a response model may include information about a rule applied when a response message is generated, such as whether an emoticon is used, a sentence length, whether an honorific title is used, an expression style, whether a buzzword is used, a TTS feature, a recommendation function, the specialized function, and the like. Table 3 below illustrates message generation information about a polite response model (e.g., assistant response model) selected based on the wake-up keyword of "my uncle" and a character response model (e.g., cute response model) selected based on the wake-up keyword of "Borong-yi".

TABLE 5

| | Polite response model | Character response model |
|---|---|---|
| Whether an emoticon is used | X | ○ |
| Sentence length | Short and brief | Regardless of length of sentence |
| Whether an honorific title is used | ○ | X |
| Expression style | Using formal expression | Using witty expression |
| Whether a buzzword is used | X | ○ (actively reflecting a new-coined word) |
| TTS features | Voice of a man | Voice of a child |
| Recommendation function | Productivity-oriented app function recommendation | Multimedia content recommendation |

TABLE 5-continued

| | Polite response model | Character response model |
|---|---|---|
| Specialized function | "I'm bored!": providing movie or show news "Sing a song!": providing frequently-listened songs | "I'm bored!": recommending a cartoon or a game "Sing a song!": providing songs of the specified genre |

According to an embodiment, TTS feature information may include parameter information necessary to synthesize a voice signal. For example, the TTS feature information may include information about a playback speed (e.g., speed: +5), a pitch (e.g., pitch bias: −5), spectrum adjustment, or the like.

According to an embodiment, the integrated intelligence system 500 may provide a response generated using the response model selected based on a wake-up keyword According to an embodiment, the user terminal 510 may display the response generated using information of the selected response model, on a display. For example, the user terminal 510 may provide a user with the response of the polite theme determined based on the wake-up keyword of "my uncle". The user terminal 510 may provide the user with a response 1411 including the short and formal expression (e.g., please press a payment button when desired menu is correct!"), through a user interface (UI) 1410 including the background screen of a dark color. For another example, the user terminal 510 may provide the user with the response of the character theme determined based on the wake-up keyword of "Borong-yi". The user terminal 510 may provide the user with a response 1421 including the long and witty expression (e.g., do you like this? I'll remember the recent ordered beverage~"), through a user interface (UI) 1420 including the background screen of a bright color.

According to an embodiment, the integrated intelligence system 500 may provide a specified service based on the selected response model.

According to an embodiment, the integrated intelligence system 500 may provide the result (or response) of the specified voice input based on the selected response model. For example, when "my uncle" is set to the wake-up keyword, the integrated intelligence system 500 may provide the result including 'movie and show information', in response to a user input of "I'm bored!". The user terminal 510 may provide a result 1431 including 'movie and show information', through a UI 1430 including the background screen of a dark color. For example, when "Borong-yi" is set to the wake-up keyword, the integrated intelligence system 500 may provide the result including 'cartoon or game information', in response to a user input of "I'm bored!". The user terminal 510 may provide a result 1441 including 'cartoon or game information', through a user interface (UI) 1440 including the background screen of a bright color.

The integrated intelligence system 500 described with reference to FIGS. 1, 2, 3, 4A, 4B, 5A, 5B, 6A, 6B, 7, 8, 9A, 9B, 10A, 10B, 11, 12, and 13 of the disclosure may select a response model based on a wake-up keyword capable of being set by the user, may generate a voice response using the selected response model, and thus may provide the personalized voice assistant service. Accordingly, it is possible to increase the usability of a voice assistant service as well as the user experience such as talking to humans and the user's ownership of the user terminal.

Figure 15:
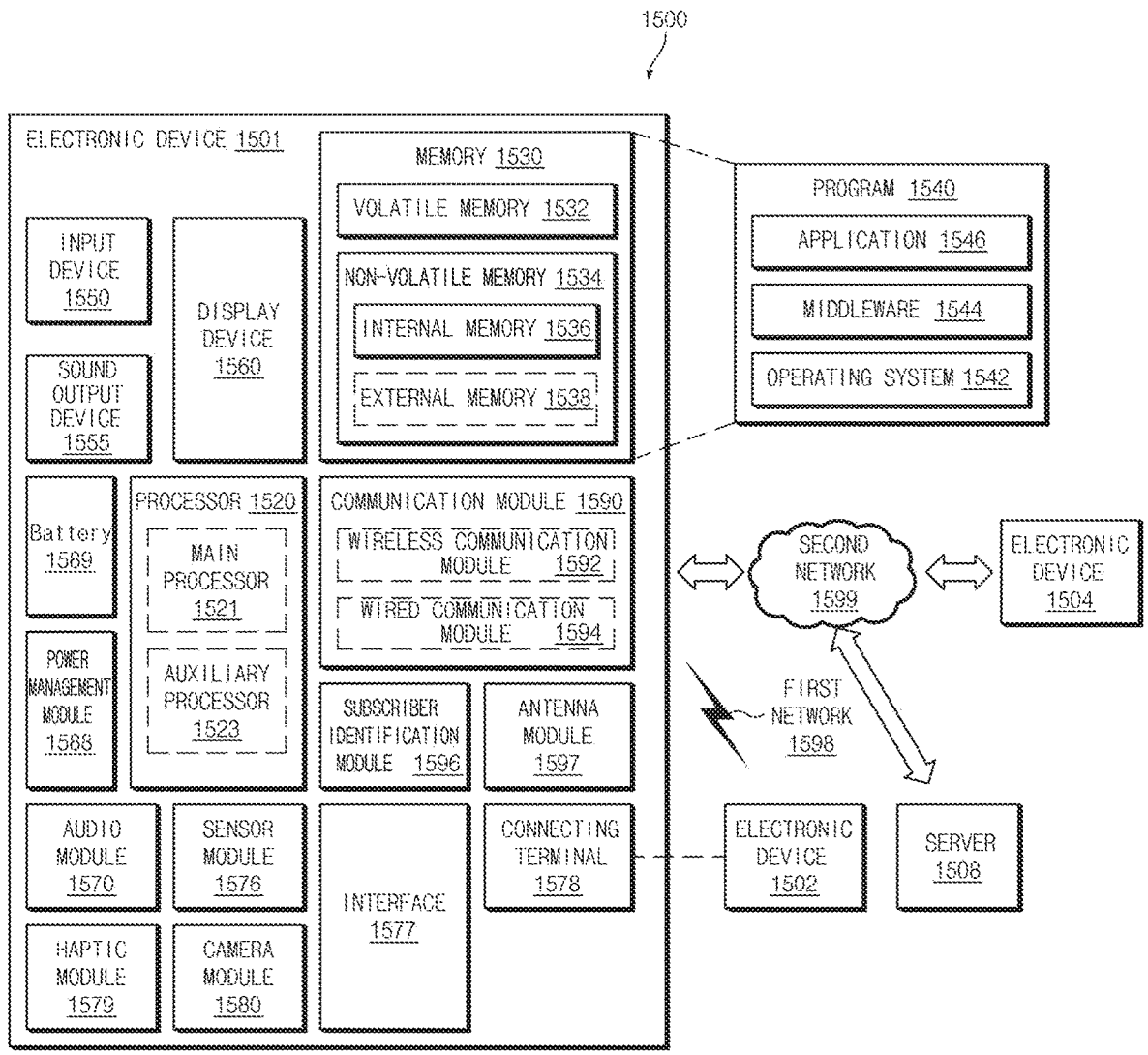
FIG. 15 is a block diagram illustrating an electronic device 1501 in a network environment 1500 according to an embodiment of the disclosure.

FIG. 15 is a block diagram illustrating an electronic device 1501 in a network environment 1500 according to an embodiment of the disclosure.

Referring to FIG. 15, the electronic device 1501 in the network environment 1500 may communicate with an electronic device 1502 via a first network 1598 (e.g., a short-range wireless communication network), or an electronic device 1504 or a server 1508 via a second network 1599 (e.g., a long-range wireless communication network). According to an embodiment, the electronic device 1501 may communicate with the electronic device 1504 via the server 1508. According to an embodiment, the electronic device 1501 may include a processor 1520, memory 1530, an input device 1550, a sound output device 1555, a display device 1560, an audio module 1570, a sensor module 1576, an interface 1577, a haptic module 1579, a camera module 1580, a power management module 1588, a battery 1589, a communication module 1590, a subscriber identification module (SIM) 1596, or an antenna module 1597. In some embodiments, at least one (e.g., the display device 1560 or the camera module 1580) of the components may be omitted from the electronic device 1501, or one or more other components may be added in the electronic device 1501. In some embodiments, some of the components may be implemented as single integrated circuitry. For example, the sensor module 1576 (e.g., a fingerprint sensor, an iris sensor, or an illuminance sensor) may be implemented as embedded in the display device 1560 (e.g., a display).

The processor 1520 may execute, for example, software (e.g., a program 1540) to control at least one other component (e.g., a hardware or software component) of the electronic device 1501 coupled with the processor 1520, and may perform various data processing or computation. According to one embodiment, as at least part of the data processing or computation, the processor 1520 may load a command or data received from another component (e.g., the sensor module 1576 or the communication module 1590) in volatile memory 1532, process the command or the data stored in the volatile memory 1532, and store resulting data in non-volatile memory 1534. According to an embodiment, the processor 1520 may include a main processor 1521 (e.g., a central processing unit (CPU) or an application processor (AP)), and an auxiliary processor 1523 (e.g., a graphics processing unit (GPU), an image signal processor (ISP), a sensor hub processor, or a communication processor (CP)) that is operable independently from, or in conjunction with, the main processor 1521. Additionally or alternatively, the auxiliary processor 1523 may be adapted to consume less power than the main processor 1521, or to be specific to a specified function. The auxiliary processor 1523 may be implemented as separate from, or as part of the main processor 1521.

The auxiliary processor 1523 may control at least some of functions or states related to at least one component (e.g., the display device 1560, the sensor module 1576, or the communication module 1590) among the components of the electronic device 1501, instead of the main processor 1521 while the main processor 1521 is in an inactive (e.g., sleep) state, or together with the main processor 1521 while the main processor 1521 is in an active state (e.g., executing an application). According to an embodiment, the auxiliary processor 1523 (e.g., an image signal processor or a communication processor) may be implemented as part of another component (e.g., the camera module 1580 or the communication module 1590) functionally related to the auxiliary processor 1523.

The memory 1530 may store various data used by at least one component (e.g., the processor 1520 or the sensor module 1576) of the electronic device 1501. The various data may include, for example, software (e.g., the program 1540) and input data or output data for a command related thererto. The memory 1530 may include the volatile memory 1532 or the non-volatile memory 1534.

The program 1540 may be stored in the memory 1530 as software, and may include, for example, an operating system (OS) 1542, middleware 1544, or an application 1546.

The input device 1550 may receive a command or data to be used by other component (e.g., the processor 1520) of the electronic device 1501, from the outside (e.g., a user) of the electronic device 1501. The input device 1550 may include, for example, a microphone, a mouse, a keyboard, or a digital pen (e.g., a stylus pen).

The sound output device 1555 may output sound signals to the outside of the electronic device 1501. The sound output device 1555 may include, for example, a speaker or a receiver. The speaker may be used for general purposes, such as playing multimedia or playing record, and the receiver may be used for incoming calls. According to an embodiment, the receiver may be implemented as separate from, or as part of the speaker.

The display device 1560 may visually provide information to the outside (e.g., a user) of the electronic device 1501. The display device 1560 may include, for example, a display, a hologram device, or a projector and control circuitry to control a corresponding one of the display, hologram device, and projector. According to an embodiment, the display device 1560 may include touch circuitry adapted to detect a touch, or sensor circuitry (e.g., a pressure sensor) adapted to measure the intensity of force incurred by the touch.

The audio module 1570 may convert a sound into an electrical signal and vice versa. According to an embodiment, the audio module 1570 may obtain the sound via the input device 1550, or output the sound via the sound output device 1555 or a headphone of an external electronic device (e.g., an electronic device 1502) directly (e.g., wiredly) or wirelessly coupled with the electronic device 1501.

The sensor module 1576 may detect an operational state (e.g., power or temperature) of the electronic device 1501 or an environmental state (e.g., a state of a user) external to the electronic device 1501, and then generate an electrical signal or data value corresponding to the detected state. According to an embodiment, the sensor module 1576 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1577 may support one or more specified protocols to be used for the electronic device 1501 to be coupled with the external electronic device (e.g., the electronic device 1502) directly (e.g., wiredly) or wirelessly. According to an embodiment, the interface 1577 may include, for example, a high definition multimedia interface (HDMI), a universal serial bus (USB) interface, a secure digital (SD) card interface, or an audio interface.

A connecting terminal 1578 may include a connector via which the electronic device 1501 may be physically connected with the external electronic device (e.g., the electronic device 1502). According to an embodiment, the connecting terminal 1578 may include, for example, a HDMI connector, a USB connector, a SD card connector, or an audio connector (e.g., a headphone connector).

The haptic module 1579 may convert an electrical signal into a mechanical stimulus (e.g., a vibration or a movement) or electrical stimulus which may be recognized by a user via his tactile sensation or kinesthetic sensation. According to an embodiment, the haptic module 1579 may include, for example, a motor, a piezoelectric element, or an electric stimulator.

The camera module 1580 may capture a still image or moving images. According to an embodiment, the camera module 1580 may include one or more lenses, image sensors, image signal processors, or flashes.

The power management module 1588 may manage power supplied to the electronic device 1501. According to one embodiment, the power management module 1588 may be implemented as at least part of, for example, a power management integrated circuit (PMIC).

The battery 1589 may supply power to at least one component of the electronic device 1501. According to an embodiment, the battery 1589 may include, for example, a primary cell which is not rechargeable, a secondary cell which is rechargeable, or a fuel cell.

The communication module 1590 may support establishing a direct (e.g., wired) communication channel or a wireless communication channel between the electronic device 1501 and the external electronic device (e.g., the electronic device 1502, the electronic device 1504, or the server 1508) and performing communication via the established communication channel. The communication module 1590 may include one or more communication processors that are operable independently from the processor 1520 (e.g., the application processor (AP)) and supports a direct (e.g., wired) communication or a wireless communication. According to an embodiment, the communication module 1590 may include a wireless communication module 1592 (e.g., a cellular communication module, a short-range wireless communication module, or a global navigation satellite system (GNSS) communication module) or a wired communication module 1594 (e.g., a local area network (LAN) communication module or a power line communication (PLC) module). A corresponding one of these communication modules may communicate with the external electronic device via the first network 1598 (e.g., a short-range communication network, such as Bluetooth™, wireless-fidelity (Wi-Fi) direct, or infrared data association (IrDA)) or the second network 1599 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1592 may identify and authenticate the electronic device 1501 in a communication network, such as the first network 1598 or the second network 1599, using subscriber information (e.g., international mobile subscriber identity (IMSI)) stored in the subscriber identification module 1596.

The antenna module 1597 may transmit or receive a signal or power to or from the outside (e.g., the external electronic device) of the electronic device 1501. According to an embodiment, the antenna module 1597 may include an antenna including a radiating element composed of a conductive material or a conductive pattern formed in or on a substrate (e.g., PCB). According to an embodiment, the antenna module 1597 may include a plurality of antennas. In such a case, at least one antenna appropriate for a communication scheme used in the communication network, such as the first network 1598 or the second network 1599, may be selected, for example, by the communication module 1590 (e.g., the wireless communication module 1592) from the plurality of antennas. The signal or the power may then be transmitted or received between the communication module 1590 and the external electronic device via the selected at least one antenna. According to an embodiment, another component (e.g., a radio frequency integrated circuit (RFIC)) other than the radiating element may be additionally formed as part of the antenna module 1597.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1501 and the external electronic device 1504 via the server 1508 coupled with the second network 1599. Each of the electronic devices 1502 and 1504 may be a device of a same type as, or a different type, from the electronic device 1501. According to an embodiment, all or some of operations to be executed at the electronic device 1501 may be executed at one or more of the external electronic devices 1502, 1504, or 1508. For example, if the electronic device 1501 should perform a function or a service automatically, or in response to a request from a user or another device, the electronic device 1501, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1501. The electronic device 1501 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 1540) including one or more instructions that are stored in a storage medium (e.g., internal memory 1536 or external memory 1538) that is readable by a machine (e.g., the electronic device 1501). For example, a processor (e.g., the processor 1520) of the machine (e.g., the electronic device 1501) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to various embodiments disclosed in the specification, an integrated intelligence system may select a response model based on a wake-up keyword capable of being set by a user to generate a voice response using the selected response model, and thus may provide the user setting the wake-up keyword with a personalized voice assistant service (or voice-based intelligent assistant service). Accordingly, it is possible to increase the usability of a voice assistant service as well as user experience such as directly talking to humans and the user's ownership of the user terminal.

Besides, a variety of effects directly or indirectly understood through the disclosure may be provided.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:
1. A system comprising:
a microphone;
a speaker;
at least one processor operatively connected to the microphone and the speaker; and
a memory operatively connected to the at least one processor,
wherein the memory is configured to store a natural language understanding (NLU) module, a first response model, and a second response model and to store instructions, when executed, that cause the at least one processor to:

enter into a sleep state or standby state,
while in the sleep state or the standby state, receive a first voice input including a first wake-up keyword for calling a voice-based intelligent assistant service, via the microphone,
in response to receiving the first voice input including the first wake-up keyword, exit the sleep state or the standby state and select the first response model based on the first wake-up keyword,
receive a second voice input via the microphone after the first voice input,
process the second voice input, using the NLU module,
generate a first response based on the processed second voice input, the first response being generated using the first response model,
in a second operation, receive a third voice input including a second wake-up keyword different from the first wake-up keyword, via the microphone,
select the second response model based on the second wake-up keyword,
receive a fourth voice input via the microphone after the third voice input,
process the fourth voice input, using the NLU module, and
generate a second response based on the processed fourth voice input, the second response being generated using the second response model.

2. The system of claim 1,
wherein the first response model includes a first natural language response generator model and a first text-to-speech (TTS) model, and
wherein the second response model includes a second natural language response generator model different from the first natural language response generator model and a second TTS model different from the first TTS model.

3. The system of claim 1, further comprising:
a user terminal; and
a server,
wherein the user terminal includes the microphone, and
wherein the server includes the memory and the at least one processor.

4. The system of claim 3,
wherein the user terminal receives the first to fourth voice inputs and provides a user with the first response and the second response, and
wherein the server selects a first voice input model and a second voice input model based on the first voice input and the third voice input and generates the first response and the second response.

5. A system comprising:
a microphone;
a speaker;
a display;
at least one processor operatively connected to the microphone and the speaker; and
a memory operatively connected to the at least one processor,
wherein the memory is configured to:
store an automatic speech recognition (ASR) module, a natural language understanding (NLU) module, and a plurality of response models, and
store instructions that, when executed, cause the at least one processor to:
enter into a sleep state or standby state,
while in the sleep state or the standby state, receive a first voice input including a first wake-up keyword via the microphone, the first wake-up keyword being defined by a wake-up keyword recognition model,
in response to receiving the first voice input including the first wake-up keyword, exit the sleep state or the standby state and extract first text data corresponding to the first wake-up keyword from the first voice input, using the ASR module,
select at least one of the response models based at least partly on the extracted first text data corresponding to the first wake-up keyword, and
display, on the display, a result of executing actions of the selected at least one of the plurality of response models based on the first voice input generated.

6. The system of claim 5, wherein the instructions cause the at least one processor to:
provide a user with a list including at least one of the response models based at least partly on the extracted first text data;
receive a user input to select at least one response model in the list; and
select the at least one response model depending on the received user input.

7. The system of claim 5,
wherein the instructions cause the at least one processor to generate a speech recognition model for recognizing a wake-up keyword based at least partly on the first voice input, and
wherein the wake-up keyword is used to call a voice-based intelligent assistant service.

8. The system of claim 7, wherein the instructions cause the at least one processor to:
receive a second voice input via the microphone after the first voice input is received; and
generate the speech recognition model based at least partly on the first voice input and the second voice input.

9. The system of claim 5, wherein the instructions cause the at least one processor to:
calculate a value indicating a relation between the extracted first text data and the plurality of response models; and
select at least one response model, of which the calculated value is not less than a specified value, from among the plurality of response models.

10. The system of claim 5, wherein the instructions cause the at least one processor to:
select at least one response model based on user information in place of the extracted first text data.

11. The system of claim 10, wherein the user information includes at least one of a gender, an age, a residence area, or user terminal usage information.

12. The system of claim 5,
wherein the instructions cause the at least one processor to:
receive a second user voice input via the microphone,
process the second user voice input, using the NLU module, and
generate a first response based on the processed second voice input, and
wherein the first response uses the selected at least one of the response models.

13. The system of claim 5, wherein each of the plurality of response models includes a text-to-speech (TTS) module.

14. A method of processing a voice input, the method comprising:

entering into a sleep state or standby state;

while in the sleep state or the standby state, receiving a first voice input including a first wake-up keyword, the first wake-up keyword being defined by a wake-up keyword recognition model;

in response to receiving the first voice input including the first wake-up keyword, exiting the sleep state or the standby state and extracting first text data corresponding to the first wake-up keyword from the first voice input, using an automatic speech recognition (ASR) module;

selecting at least one of a plurality of response models based at least partly on the extracted first text data corresponding to the first wake-up keyword; and displaying a result of executing actions of the selected at least one of the plurality of response models based on the first voice input generated.

15. The method of claim 14, further comprising:

generating a speech recognition model for recognizing the first wake-up keyword based at least partly on the first voice input, wherein the wake-up keyword is used to call a voice-based intelligent assistant service.

16. The method of claim 15, further comprising:

receiving a second voice input through a microphone after the first voice input is received; and generating the speech recognition model based at least partly on the first voice input and the second voice input.

17. The method of claim 14, wherein the selecting of the at least one of the response models includes:

calculating a value indicating a relation between the extracted first text data and the plurality of response models; and selecting at least one response model, of which the calculated value is not less than a specified value, from among the plurality of response models.

18. The method of claim 14, wherein the selecting of the at least one of the response models includes:

selecting at least one response model based on user information in place of the extracted first text data.

19. The method of claim 18, wherein the user information includes at least one of a gender, an age, a residence area, or user terminal usage information.

20. The method of claim 14, further comprising:

receiving a second user voice input;

processing the second user voice input, using a natural language understanding (NLU) module; and generating a first response based on the processed second voice input, wherein the first response uses the selected at least one of a plurality of response models.

\* \* \* \* \*